United States Patent US 10,986,558 B2
Raghothaman et al. (45) Date of Patent: Apr. 20, 2021

(54) COORDINATED LISTEN BEFORE TALK (C-LBT) FOR LONG TERM EVOLUTION (LTE) LICENSED-ASSISTED ACCESS (LAA)

(71) Applicant: CommScope Technologies LLC, Hickory, NC (US)

(72) Inventors: Balaji B Raghothaman, Chester Springs, PA (US); Ehsan Daeipour, Southborough, MA (US); Pablo Caballero Garces, Austin, TX (US)

(73) Assignee: CommScope Technologies LLC, Hickory, NC (US)

( * ) Notice: Subject to any disclaimer, the term of this patent is extended or adjusted under 35 U.S.C. 154(b) by 8 days.

(21) Appl. No.: 16/400,911

(22) Filed: May 1, 2019

(65) Prior Publication Data

US 2019/0342798 A1 Nov. 7, 2019

Related U.S. Application Data

(60) Provisional application No. 62/667,395, filed on May 4, 2018.

(51) Int. Cl.
*H04W 28/26* (2009.01)
*H04W 74/08* (2009.01)
(Continued)

(52) U.S. Cl.
CPC .......... *H04W 40/22* (2013.01); *H04B 17/336* (2015.01); *H04W 28/0815* (2020.05);
(Continued)

(58) Field of Classification Search
CPC ............. H04W 28/26; H04W 74/0808; H04W 72/085; H04W 72/082; H04W 72/0446;
(Continued)

(56) References Cited

U.S. PATENT DOCUMENTS 10,687,371 B2* 6/2020 Gunasekara ............ H04L 12/14
2016/0037550 A1 2/2016 Barabell et al.
(Continued)

FOREIGN PATENT DOCUMENTS

WO 2017171913 A1 10/2017

OTHER PUBLICATIONS

Campos et al. "Dealing with the Hidden Node Problem in Multioperator LAA-LTE Scenarios", Sep. 2018, IEEE (Year: 2018).*
(Continued)

*Primary Examiner* — Omer S Mian
(74) *Attorney, Agent, or Firm* — Fogg & Powers LLC

(57) ABSTRACT

A system for channel access in Long Term Evolution (LTE) License-Assisted Access (LAA) is disclosed. The system includes a controller and a plurality of radio points. A level one radio point transmits a first reservation signal in response to a first backoff counter reaching zero. The first reservation signal indicates that the level one radio point will begin a first transmission of a first duration starting in a next subframe. A candidate level two radio point receives the first reservation signal and determines whether the candidate level two radio point received the first reservation signal with a signal to interference noise ratio (SINR) that exceeds a reservation detection threshold for the candidate level two radio point.

20 Claims, 12 Drawing Sheets

(51) Int. Cl.
| | |
|---|---|
| *H04W 72/08* | (2009.01) |
| *H04B 17/336* | (2015.01) |
| *H04W 72/04* | (2009.01) |
| *H04W 28/08* | (2009.01) |
| *H04W 92/04* | (2009.01) |
| *H04W 40/22* | (2009.01) |
| *H04W 92/16* | (2009.01) |
| *H04W 84/10* | (2009.01) |

(52) U.S. Cl.
CPC ....... *H04W 28/26* (2013.01); *H04W 72/0446* (2013.01); *H04W 72/082* (2013.01); *H04W 72/085* (2013.01); *H04W 74/0808* (2013.01); *H04W 92/04* (2013.01); *H04Q 2209/25* (2013.01); *H04W 84/10* (2013.01); *H04W 92/16* (2013.01)

(58) Field of Classification Search
CPC . H04W 28/0815; H04W 84/10; H04W 84/04; H04W 92/16; H04W 92/04; H04W 40/22; H04B 17/336; H04Q 2209/25
See application file for complete search history.

(56) References Cited

U.S. PATENT DOCUMENTS

| | | | |
|---|---|---|---|
| 2016/0353467 | A1 | 12/2016 | Nekovee |
| 2017/0013470 | A1 | 1/2017 | Sun et al. |
| 2017/0111922 | A1* | 4/2017 | Uchino ............. H04W 72/1257 |
| 2017/0164403 | A1 | 6/2017 | Lindheimer et al. |
| 2018/0139617 | A1* | 5/2018 | Belghoul .......... H04W 74/0808 |
| 2018/0288625 | A1* | 10/2018 | Chandrasekhar ..... H04L 1/1896 |
| 2018/0302911 | A1* | 10/2018 | Aijaz ................ H04W 72/0446 |

OTHER PUBLICATIONS

"Discussion of hidden node problem of LAA", 3GPP TSG RAN WG1 Meeting #80, Feb. 2015, pp. 1-4, Athens, Greece.
3GPP TR 36.902 V9.3.1, "3rd Generation Partnership Project; Technical Specification Group Radio Access Network; Evolved Universal Terrestrial Radio Access Network (E-UTRAN); Self-configuring and self-optimizing network (SON use cases and solutions (Release 9)", Mar. 2011, pp. 1-21, 3GPP, LTE.
3GPP, "Evolved Universal Terrestrial Radio Access (E-UTRA); Physical layer procedures", 3GPP TS 36.213 V13.0.0 Rel. 13, May 2016, pp. 13-28, 3GPP, LTE.
AT&T, "At&T Reaches Wireless Speeds of More than 750 Mbps with LTE Licensed Assisted Access (LTE-LAA) Field Trials", Jun. 16, 2017, pp. 1-5, San Francisco, CA.
Baccelli et al., "Stochastic Geometry and Wireless Networks, vol. II—Applications", HAL, Dec. 2009, pp. 1-225.
Bhorkar et al., "Performance Analysis of LTE and Wi-Fi in Unlicensed Band Using Stochastic Geometry", IEEE 25th Annual International Symposium on Personal, Indoor, and Mobile Radio Communication (PIMRC), Sep. 2014, pp. 1310-1314.
FCC, "Revision of Parts 2 and 15 of the Commission's Rules to Permit Unlicensed National Information Infrastructure (U-NII) devices in the 5GHz band", Federal Communications Commission, FCC 03-287; Nov. 18, 2003.
Fullmer et al., "Solutions to Hidden Terminal Problems in Wireless Networks", Computer Engineering Department University of California, Aug. 1997, pp. 1-11, Santa Cruz, CA.
Ibars et al., "Channel Selection for Licensed Assisted Access in LTE based on UE Measurements", IEEE 82nd Vehicular Technology Conference (VTC2015-Fall), Sep. 2015, pp. 1-5, IEEE.
ITU-R, "Guidelines for evaluation of radio interface technologies for IMT-Advanced", M Series Mobile, radiodetermination, amateur and related satellites services, Dec. 2009, pp. 1-72, International Telecommunication Union.
Kudo et al., "User Equipment Centric Downlink Access in Unlicensed Spectrum for Heterogeneous Mobile Network", IEICE Transactions on Communications, Oct. 2015, pp. 1969-1977, The Institute of Electronics, Information and Communication Engineers.
L.-U Forum, "LTE-U Technical Report Coexistence Study for LTE-U SDL", Feb. 2015, pp. 1-52, TR v1.0.
Lee et al., "Performance Analysis of License Assisted Access LTE with Asymmetric Hidden Terminals", Dec. 13, 2016, pp. 1-14.
Li et al., "LTE in the Unlicensed Spectrum: A Novel Coexistence Analysis with WLAN Systems", IEEE Global Communications Conference, Dec. 2014, pp. 3459-3464, IEEE.
Li et al., "Modeling and Analyzing the Coexistence of Wi-Fi and LTE in Unlicensed Spectrum", IEEE Transactions on Wireless Communications, Oct. 2015, pp. 1-32, IEEE.
Nguyen et al., "A Stochatic Geometry Analysis of Dense IEEE 802.11 Networks", IEEE INFOCOM 2007—26th IEEE International Conference on Computer Communications, May 2007, pp. 1199-1207, IEEE.
Nihtila et al., "System performance of LTE and IEEE 802.11 coexisting on a shared frequency band", IEEE Wireless Communications and Networking Conference (WCNC), Apr. 2013, pp. 1038-1043, IEEE.
Qualcomm, "Qualcomm Research LTE in Unlicensed Spectrum: Harmonious Coexistence with Wi-Fi", Jun. 2014, pp. 1-19, Qualcomm Technologies, Inc.
Sagari et al., "Coordinated Dynamic Spectrum Management of LTE-U and Wi-Fi Networks", IEEE International Symposium on Dynamic Spectrum Access Networks (DySPAN), 2015, pp. 209-220, IEEE.
T-Mobile Newsroom, "Samsung Galaxy S8 Will be Twice as Fast in Hundreds of Cities on T-Mobile's Advanced LTE Network", Mar. 28, 2017, pp. 1-16, T-Mobile.
T-Mobile Newsroom, "T-Mobile Completes Nation's First Live Commercial Network Test of License Assisted Access (LAA)", Jun. 25, 2017, pp. 1-4, T-Mobile.
Tobagi et al., "Packet Switching in Radio Channels: Part II—The Hidden Terminal Problem in Carrier Sense Multiple-Access and the Busy-Tone Solution", IEEE Transactions on Communications, Dec. 1975, pp. 1417-1433, vol. Com-23, No. 12, IEEE.
International Searching Authority, "International Search Report and Written Opinion from PCT Application No. PCT/US2019/030257 dated Aug. 6, 2019", from Foreign Counterpart to U.S. Appl. No. 16/400,911, pp. 1-10, Published: WO.

* cited by examiner

COORDINATED LISTEN BEFORE TALK (C-LBT) FOR LONG TERM EVOLUTION (LTE) LICENSED-ASSISTED ACCESS (LAA)

CROSS-REFERENCE TO RELATED APPLICATIONS

This application claims the benefit of U.S. Provisional Patent Application Ser. No. 62/667,395 filed on May 4, 2018, entitled "COORDINATED LISTEN BEFORE TALK (C-LBT) FOR LONG TERM EVOLUTION (LTE) LICENSED-ASSISTED ACCESS (LAA)", the entirety of which is incorporated herein by reference.

BACKGROUND

The exponential growth in demand for capacity of traditional licensed spectrum cellular network is fueling industrial, academic and standardization efforts to achieve innovative solutions that helps to meet the forecasted requirements for next generation networks. Licensed spectrum under 6 GHz is scarce, while there is a large amount of unlicensed spectrum underutilized in the 5 GHz band. This situation motivated interest in the use of unlicensed spectrum for cellular communications.

Particularly prominent has been the idea of using unlicensed spectrum to assist downlink in licensed Long Term Evolution (LTE) communications. Also known as Licensed Assisted Access (LAA), this technique may exploit the readily available carrier aggregation techniques of LTE to use an LTE license band supporting downlink, uplink, signaling and authentication, combined with one (or more) unlicensed bands to support the user downlink. Thus, LAA may enhance coverage, increase performance, and benefit mobility management. Unlicensed spectrum carrier aggregation allows users to combine licensed and unlicensed spectrum to boost their communications, versus the current scheme, in which users must choose among different technologies to make use of both types of spectrum.

The use of the readily-available and free-to-transmit unlicensed spectrum creates an opportunity for a distributed and technology-oblivious mechanism to share the channel by controlling access. Channel access procedures for LAA are standardized in LTE Release 13, which includes the use of a coexistence mechanism known as Listen Before Talk (LBT) to ensure fair channel access between LTE and other technologies operating in the 5 GHz band, such as Wi-Fi or Zigbee.

Other access mechanisms, such as discontinuous transmissions, are also being developed to be implemented in regions which are not expected to meet LBT requirements, e.g., Unlicensed National Information Infrastructure (U-NII) radio bands 5.15 GHz-5.85 GHz regulated by the Federal Communications Commission (FCC) and specially propelled by the LTE-Unlicensed (LTE-U) Forum. This forum is an industrial partnership that generated the technical specifications of 5 GHz supplemental downlink assistance for unlicensed LTE (LTE-U) and exemplifies the outstanding interest of the industry. Although LAA is not widely in use, various commercial networks are performing live tests, and mobile devices are beginning to include LTE-U compatibility.

However, LAA is not designed for use with a base station (more specifically, an LTE Evolved Node B or "eNodeB" or "eNB") that is implemented using a distributed architecture. Typically, such a distributed architecture uses a centralized controller and multiple distributed radio points. This architecture is also referred to as a "cloud" or "centralized" radio access network or "C-RAN." Therefore, there is a need for a Coordinated Listen Before Talk (C-LBT) mechanism for LAA that can utilize the distributed architecture of a C-RAN.

SUMMARY

A system for channel access in Long Term Evolution (LTE) License-Assisted Access (LAA) is provided. The system includes a controller and a plurality of radio points. A level one radio point transmits a first reservation signal in response to a first backoff counter reaching zero. The first reservation signal indicates that the level one radio point will begin a first transmission of a first duration starting in a next subframe. A candidate level two radio point receives the first reservation signal and determines whether the candidate level two radio point received the first reservation signal with a signal to interference noise ratio (SINR) that exceeds a reservation detection threshold for the candidate level two radio point.

DRAWINGS

Understanding that the drawings depict only exemplary configurations and are not therefore to be considered limiting in scope, the exemplary configurations will be described with additional specificity and detail through the use of the accompanying drawings, in which.

Figure 1:
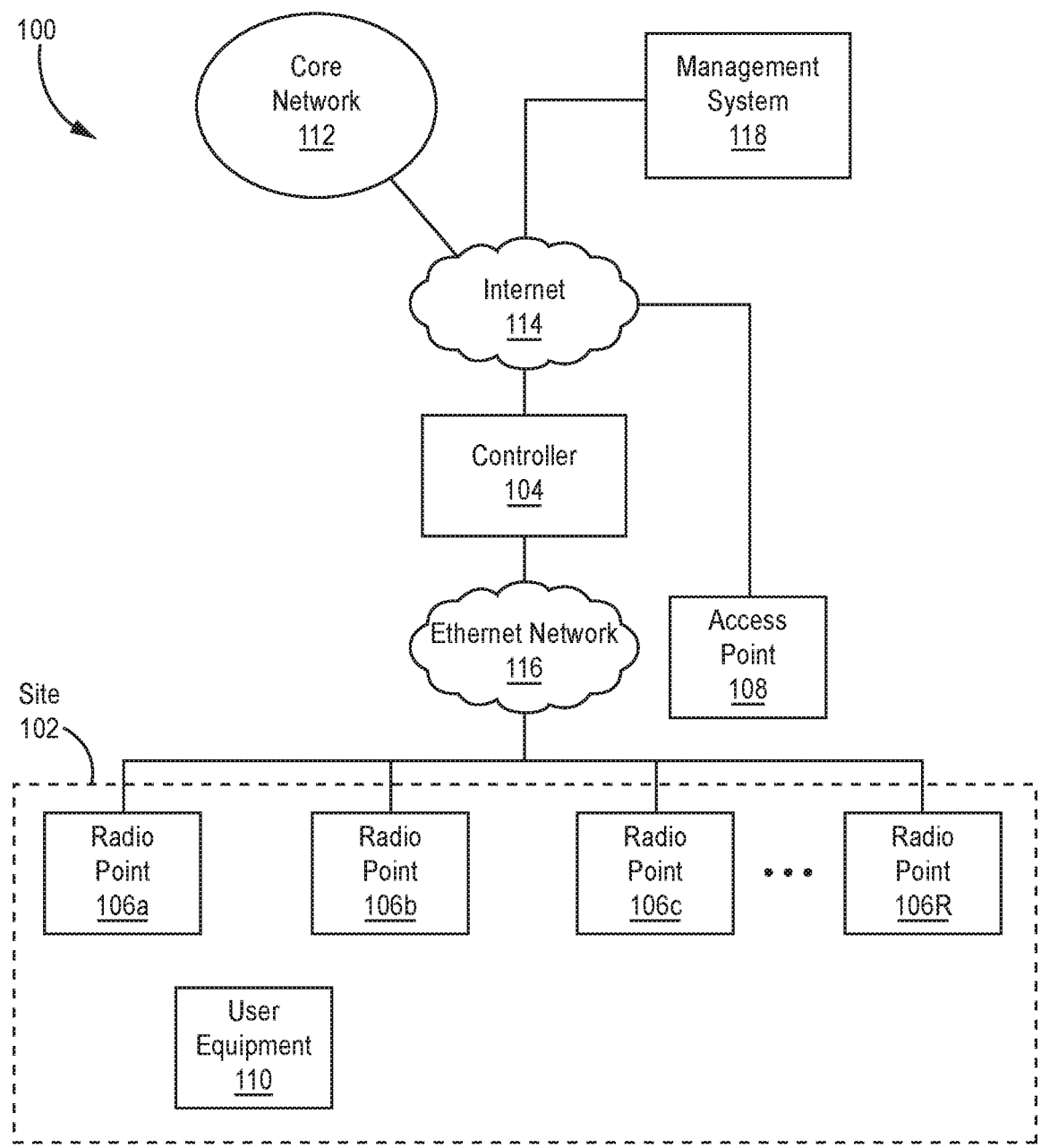
FIG. 1 is a block diagram illustrating one exemplary configuration of a cloud radio access network (C-RAN) system that implements a Coordinated Listen Before Talk (C-LBT) technique for Licensed-Assisted Access (LAA)

In accordance with common practice, the various described features are not drawn to scale but are drawn to emphasize specific features relevant to the exemplary configurations.

DETAILED DESCRIPTION

In the recent years, various works have studied the use of unlicensed spectrum from different perspectives. With the aim to enhance coexistence between Wi-Fi and LTE on licensed spectrum, several works have analyzed diverse mechanisms, e.g., discontinuous transmission, centralized coordination, channel selection, licensed-assisted channel access acquisition mechanisms and coexistence without protocol modifications. In contrast to previous work, the present systems and methods use a modification to the standardized LBT and aims to preserve its coexistence properties while exploiting the coordination provided by a Cloud-RAN LAA network to enhance its performance.

Specifically, one of the main problems of Listen Before Talk (LBT) in LAA networks is the inability of achieving higher network rates by performing network densification. In general, LBT can be thought of as a distributed round-robin in which the transmission time is divided among the different participant radio points (RPs) and/or access points (APs). Therefore, increasing the number of RPs results in a reduction of the average user distance to its serving RP, and therefore an increase of the modulation and coding scheme (MCS) of the average user. The increased MCS may come at the cost of a reduction of the amount of time that each RP is transmitting, which counteracts any significant gains from densification.

To address these problems of LBT, the present systems and methods describe a Coordinated Listen Before Talk (C-LBT) mechanism for LAA. C-LBT allows multiple RPs to transmit at the same time, enhancing their transmission opportunities and improving the network performance while preserving the coexistence with Wi-Fi transmissions and complying with the coexistence imposed by the original LBT. To achieve this, C-LBT aims to be a procedure that leaves other technologies access capabilities intact, only allowing the multi-RP transmissions during LTE transmission opportunities.

Therefore, the C-LBT of the present systems and methods presents an easy-to-implement channel access solution that may achieve significant performance improvements over the standardized (non-coordinated) LBT by enabling multiple transmissions, thus allowing densification improvements. Compared with LBT, C-LBT may achieve a significant improvement in total throughput (more than 100% relative gain), an increased median and mean user throughput and a higher network utility without affecting the coexistence with other technologies sharing the channel.

It should be noted that stochastic geometry analysis may be used to provide a mathematical framework to address the coexistence and performance of several channel access mechanisms for unlicensed spectrum transmission, including LBT. The present systems and methods may extend stochastic geometry analysis to compare the coexistence and performance properties of the coordinated LBT (C-LBT) described herein versus the standardized LBT. Specifically, as described in detail below, C-LBT may preserve the coexistence properties of the LBT mechanism while achieving a higher LAA network performance.

Furthermore, one of the problems associated with LBT (or its Institute of Electrical and Electronics Engineers (IEEE) 802.11 counterpart Distributed Coordination Function (DCF)) is the problem of hidden and exposed terminals. In 802.11 this problem has been solved by the Request to Send/Clear to Send (RTS/CTS) protocol, but there is not a similar protocol that intercommunicates LTE (e.g., using LBT) and Wi-Fi (e.g., DCF). There is an ongoing discussion in the industry about how to solve this problem, as well as some work aimed to analyze the performance of LAA under the presence of hidden terminals. The present systems and methods are described in the absence of hidden and exposed nodes. However, the present systems and methods may be used in systems with hidden and/or exposed nodes.

FIG. 1 is a block diagram illustrating one exemplary configuration of a cloud radio access network (C-RAN) system 100 that implements a Coordinated Listen Before Talk (C-LBT) technique for Licensed-Assisted Access (LAA). The system 100 may be deployed at a site 102 (e.g., in a contiguous area). The system may be used as a small cell network to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area).

In the exemplary configuration in FIG. 1, the system 100 is implemented at least in part using a Cloud Radio Access Network (C-RAN) (e.g., a point-to-multipoint distributed base station) architecture that employs at least one baseband unit 104 and R radio points (RPs) 106A-R (also referred to as $R = \{r_1, r_2, \ldots, r_R\}$). The system 100 may also be referred to as a C-RAN system 100. The baseband unit 104 may also be referred to as baseband controller 104 or controller 104. Each RP 106 may be coupled to one or more antennas via which downlink RF signals are radiated to surrounding user equipment (UE) 110 and via which uplink RF signals transmitted by UEs 110 are received. For example, each RP 106 may include one, two, or four antennas.

The system 100 is coupled to the core network 112 of each wireless network operator over an appropriate back-haul. In the exemplary configuration shown in FIG. 1, the Internet 114 is used for back-haul between the system 100 and various core networks 112. However, it is to be understood that the back-haul can be implemented in other ways.

The exemplary configuration of the system 100 shown in FIG. 1 is described here as being implemented as a Long Term Evolution (LTE) radio access network providing wireless service using an LTE air interface. LTE is a standard developed by the 3rd Generation Partnership Project (3GPP) standards organization. The controller 104 and RPs 106 may be used together to implement an LTE Evolved Node B (also referred to here as an "eNodeB" or "eNB") that is used to provide user equipment 110 with mobile access to the wireless network operator's core network 112 to enable the user equipment 110 to wirelessly communicate data and voice (using, for example, Voice over LTE (VoLTE) technology).

In LTE, the core network 112 may implemented as an Evolved Packet Core (EPC) 112 comprising standard LTE EPC network elements such as, for example, a mobility management entity (MME) (not shown) and a Serving Gateway (SGW) (not shown) and, optionally, a Home eNodeB gateway (HeNB GW) (not shown) and a Security Gateway (SeGW) (not shown).

The controller 104 and the radio points 106 can be implemented so as to use an air interface that supports one or more of frequency-division duplexing (FDD) and/or time-division duplexing (TDD). Also, the controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controller 104 and the radio points 106 can implement one or more of the LTE transmission modes.

Moreover, the controller 104 and/or the radio points 106 can be configured to support multiple air interfaces and/or to support multiple wireless operators.

In the exemplary configuration shown in FIG. 1, the front-haul that communicatively couples each controller 104 to the one or more RPs 106 may be implemented using a standard ETHERNET network 116. However, it is to be understood that the front-haul between the controllers 104 and RPs 106 can be implemented in other ways.

Analog radio frequency (RF) functions for the air interface as well as digital Layer 1, Layer 2, and Layer 3 (of the Open Systems Interconnection (OSI) model) functions for the air interface may be allocated between the controller 104 and the RPs 106. For example, the controller 104 may perform at least some of the Layer-3 processing, Layer-2 processing, and Layer-1 processing for the LTE air interface implemented by the C-RAN system 100, and each RP 106 may implement any Layer-1 processing for the air interface that is not performed in the controller 104 and one or more radio frequency (RF) circuits (not shown) that implement the RF front-end functions for the air interface and the one or more antennas associated with that RP 106. Alternatively, the baseband controller 104 can be configured to perform all of the digital Layer-3, Layer-2, and Layer-1 processing for the air interface, while the RPs 106 (specifically, the RF circuits) implement only the RF functions for the air interface and the antennas associated with each RP 106.

In the exemplary configuration shown in FIG. 1, a management system 118 is communicatively coupled to the controllers 104 and RPs 106, for example, via the Internet 114 and ETHERNET network 116 (in the case of the RPs 106).

In the exemplary configuration shown in FIG. 1, the management system 118 communicates with the various elements of the system 100 using the Internet 114 and the ETHERNET network 116. Also, in some implementations, the management system 118 sends and receives management communications to and from the controllers 104, each of which in turn forwards relevant management communications to and from the RPs 106.

The system 100 is configured to use unlicensed RF spectrum to deliver LTE wireless service using Licensed-Assisted Access (LAA). The following description will focus on a C-LBT mechanism for channel access of the RPs 106 in the unlicensed (e.g., 5 GHz) band. Other LAA processes occurring in the Licensed Spectrum band will not be described herein.

The following description will assume SISO operation using carrier aggregation of a single licensed and a single unlicensed band. However, the L-CBT described herein may be used with MIMO, SIMO, MISO, and/or beam forming schemes. Furthermore, a set of N Wi-Fi Access Points (AP) 108A-N (also referred to as $A=\{a_1, \ldots, a_N\}$) may be situated in or near the site 102 and may transmit in the same band as the RPs 106 of the unlicensed LAA network, i.e., one or more of the APs 108 may interfere with communications between the RPs 106 and the UE 110.

LBT Channel Access

For the purposes of illustration, the C-LBT of the present systems and methods may be compared to an LBT procedure. Accordingly, it may be helpful to briefly review the LBT mechanism in order to better understand C-LBT.

To gain access to the media, RPs 106 may perform an LBT channel access procedure that is similar to the Distributed Coordination Function (DCF) of IEEE 802.11 systems.

The LBT channel access procedure is described in more detail in 3GPP TS 36.213 v13.0.0 Rel. 13, but is summarized below.

According to the LBT specification, each RP 106 ($r$) picks a random LBT duration counter ($D_r^{LBT}$) in a distributed manner and evaluates, at each time slot, whether the channel is "idle," i.e., whether there is any ongoing transmission. If a time slot is considered "idle," the RP 106 may decrement its $D_r^{LBT}$ by a unit, and may access the channel when its counter reaches zero. Once an RP 106 has gained access to the medium, the RP may transmit for a maximum duration ($T_{mcot}$) period after which the RP 106 may automatically pick a new LBT Duration ($D_r^{LBT}$) and the distributed process continues. An LBT slot may be considered "idle" if a detected energy level is below an energy detection threshold ($\Gamma_{ed}$) for a at least predetermined period of time in the slot, e.g., at least 4 μs out of the 9 μs in the slot.

The LAA network may have a priority class 3 for accessing the unlicensed channel, although the present systems and methods may be compatible with other priority classes. For priority class 3, $T_{mcot}$=8 ms and the ($D_r^{LBT}$) may be specified as:

$$D_r^{LBT}=T_d+N_{init}+T_{sl}$$

where $T_d$ is a deferral duration (e.g., 43 μs), $T_{sl}$ is the LBT lot duration (e.g., 9 μs), and $N_{init}$ is an initializing random number (e.g., between 0 and the size of the contention window (CW)). The size of the CW may be adjusted based on the priority class and the Hybrid Automatic Repeat Request Non-Acknowledgment (HARQ NAK) rate for each RP 106. The contention window may be reset to a minimum CW (i.e., CW=minCW) when less than 20% of HARQ feedback received in the most recent Physical Downlink Shared Channel (PDSCH) transmission from the RP 106 is a non-acknowledgement (NAK). Otherwise, the CW size is incremented to next highest value up to the maximum allowed CW (i.e., CW=maxCW). The available values for the CW for priority class 3 may be 15 (minCW), 31, or 63 (maxCW). Using these possible CW values, the LBT duration ($D_r^{LBT}$) for a priority class 3 LAA network may be between 178 and 610 μs.

The AP(s) 108 may implement 802.11 DCF for channel access coordination. Therefore, each AP 108 may assess if the channel is not clear by ensuring that any Wi-Fi signal exceeds a carrier sense threshold ($\Gamma_{cs}$) or any other undecodable signal (including LTE) exceeds the energy detection threshold ($\Gamma_{ed}$). Once the channel is assessed to be clear, the AP 108 may proceed with a backoff random counter mechanism, similar to LBT, transmitting during a period of $\Gamma_{mcot}$=3 ms once this counter reaches 0. The AP 108 may use Carrier Sense Multiple Access/Collision Avoidance (CSMA/CA) without including any Request to Send/Clear to Send (RTS/CTS) mechanism.

Association, Link Estimation, and Scheduling

The small cell LAA Cloud RAN network 100 may assist the downlink communications of a set of active LTE users U at the beginning of each Transmission Time Interval (TTI). For simplicity, we will assume that users' association is fixed with the closest RP 106, further defining the set of users associated with an RP r as $U_r$, and represent the rate of a user u as $r_u=c_u f_u$, where $f_u$ is the fraction of resources devoted to each user at each RP 106 and $c_u$ is the maximum achievable rate by a user given its achievable Modulation and Coding Scheme (MCS) in the network. The signal to interference noise ratio (SINR) of a user u associated with RP r may be computed as:

$$SINR_u = \frac{\Lambda_r G_{u,r}}{\sigma^2 + I_u}$$

where $\Lambda_r$ is the transmit power of its associated RP 106, $\sigma^2$ is thermal noise, and $G_{u,r}$ denotes the channel gain between user u and RP r, which includes pathloss, normal distributed shadowing and antenna gain. Iu is the total interference seen by user u.

The interference of a user (Iu) from the rest of the small cells (e.g., RPs 106) may be captured in:

$$Iu = \sum_{v \in \theta, v \neq r} \Lambda_v G_{u,v}$$

where $\Theta$ is the set of RPs 106 transmitting at a given TTI. Then, the user efficiency may be computed as $E_u = B \cdot \log_2(1+SINR_u)$, where B denotes the bandwidth. The MCS may be selected according to the efficiency thresholds for a block error rate (BLER) of less than a 10% mapped to total block size (TBS), e.g., according to Table 7.1.7.1-1 in 3GPP TS 36.213 v13.0.0. Maximum achievable rates per TTI are computed according to the Transport block size, e.g., using Table 7.1.7.2.1-1 of 3GPP TS 36.213 v13.0.0.

Furthermore, a proportional fairness scheduler may be used, which attempts to maximize a welfare/utility function $$W(r_u) = \sum_{u \in U} \log(r_u) = \sum_{u \in U} \log(c_u f_u)$$

The rates, constrained by the physical resource limit of each RP 106, may be given by Equation (1):

$$\max_f \sum_{u \in U} \log(c_u f_u); \text{ subject to } \sum_{u \in U} f_u \leq 1, \forall r \in R$$

where $f_u$ is the fractional resources allocated to user u and $c_u$ is the maximum achievable rate of user u.

The solution to the maximization in Equation (1) corresponds to assignment, at each RP 106, resources uniformly among the associated users, which in turn may experience a rate during the TTI period of $$r_u = \frac{c_u}{|U_r|}$$

where $|U_r|$ is the number of users associated with RP r.

Coordinated Listen Before Talk (C-LBT) Description

Figure 2:
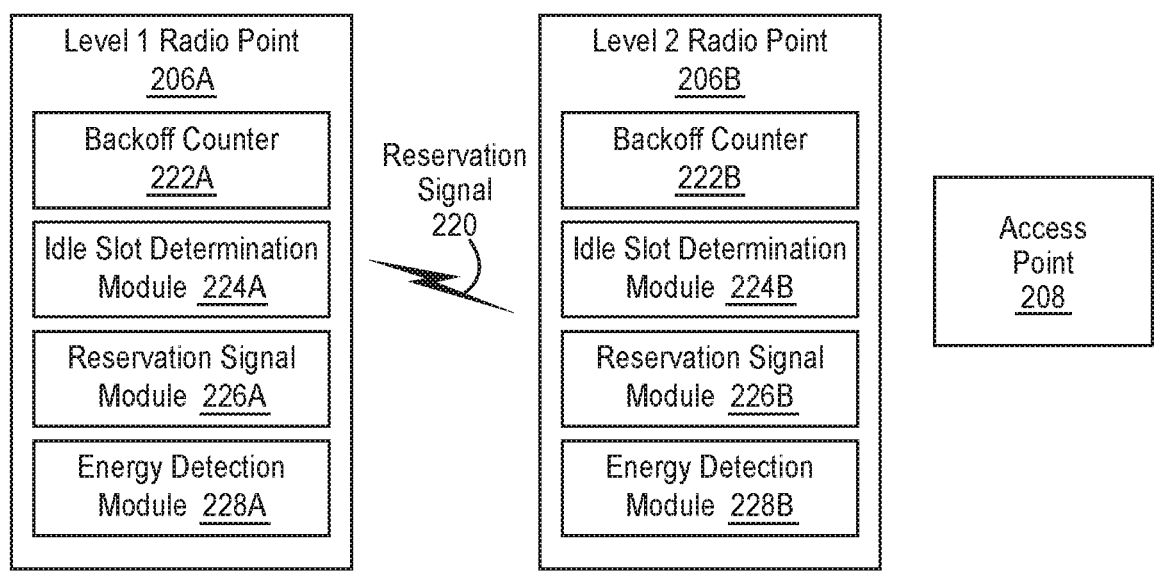
FIG. 2 is a block diagram illustrating an exemplary C-RAN configuration using C-LBT.

FIG. 2 is a block diagram illustrating an exemplary C-RAN configuration using C-LBT. Specifically, FIG. 2 illustrates two RPs 206A-B that may belong to the same C-RAN and use a C-LBT mechanism for LAA. Each of the RPs 206 may include a backoff counter ($D_r^{LBT}$) 222A-B, an idle slot determination module 224A-B, a reservation signal module 226A-B and an energy detection module 228A-B. The L1-RP 206A and the L2-RP 206B may be part of a C-RAN with other RPs (not shown), e.g., one or more L3-RPs, etc. Furthermore, each RP 206 may include additional hardware and/or software not illustrated in FIG. 2.

One or more APs 208 may be positioned close enough to interfere with signals received at the L2-RP 206B.

The RPs 206 may use a C-LBT mechanism based on a "spread the voice" mechanism. During operation, the RPs 206 may evaluate, at each time slot, whether the channel is "idle," i.e., whether there is any ongoing transmission. For example, the idle slot determination module 224 may use measurements from the energy detection module 228 to determine if the slot is "idle," e.g., whether the energy detected in the time slot is less than an energy detection threshold ($\Gamma_{ed}$) for a required portion of the time slot. If a time slot is considered "idle," the L1-RP 206A may decrement its backoff counter ($D_r^{LBT}$) by a unit, and may access the channel when its counter reaches 0. When an RP's backoff counter ($D_r^{LBT}$) 222A reaches zero, it becomes an L1-RP 206A and may access the channel. As used herein, the term "Level 1" or "L1" refers to an RP 206A that gains access to the channel in response to its backoff counter ($D_r^{LBT}$) 222A reaching zero. Once the L1-RP 206A gains access to the medium to transmit, it may send a reservation signal 220 that includes a custom pattern or message recognizable by other RPs (e.g., L2-RP 206B) in the C-RAN. The reservation signal 220 may be formed in the reservation signal module 226A of the L1-RP 206A.

The reservation signal 220 may indicate that an LTE transmission (e.g., PDSCH resource blocks) will take the channel, inviting other RPs (e.g., L2-RP 206B) to automatically join the transmission of the L1-RP 206A, independently of their backoff counter ($D_r^{LBT}$) 222B. In other words, upon receiving the reservation signal 220 from the L1-RP 206A with a sufficiently high SINR, the L2-RP 206B may access the channel even if its backoff counter ($D_r^{LBT}$) 222B has not reached zero. As used herein, the term "Level 2" or "L2" refers to an RP 206B that receives the reservation signal 220 from the L1-RP 206A with an SINR that exceeds a predetermined reservation detection threshold ($\Gamma_L$) for the RP 206B. Each RP 206 may use a different reservation detection threshold ($\Gamma_L$) as other RPs 206 based on its location and neighbors. Selection/estimation of a reservation detection threshold ($\Gamma_L$) is discussed below. In the example illustrated in FIG. 2, the AP 208 is not transmitting, so the L2-RP 206B is able to receive the reservation signal 220 with a sufficiently high SINR so the L2-RP 206B qualifies as an L2-RP 206B. In response, the L2-RP 206B may transmit before its backoff counter ($D_r^{LBT}$) reaches zero.

An RP (e.g., RP 206B) may be referred to as a "candidate" (e.g., "candidate L2-RP") herein when it receives the reservation signal 220 from another RP (e.g., L1-RP 206A) with an SINR that does not exceed its predetermined reservation detection threshold ($\Gamma_L$) or the RP (e.g., RP 206B) has not yet evaluated the SINR of the reservation signal 220 with respect to its reservation detection threshold ($\Gamma_L$). For example, upon receiving a reservation signal from the L1-RP 206A, the L2-RP 206B may be referred to as a candidate L2-RP because it does not yet know if it qualifies as a L2-RP 206B, i.e., whether the reservation signal 220 was received with an SINR that exceeds its predetermined reservation detection threshold ($\Gamma_L$). Although SINR is described throughout, other signal metrics may be used, e.g., signal to noise ratio (SNR), rise over thermal (ROT), interference over thermal (IOT), etc.

The reservation detection threshold ($\Gamma_L$) may ensure that the L2-RP 206B will not interfere with the Wi-Fi AP 108 transmitting. The transmissions of the L2-RP 206B (if any) may be scheduled to finish at the same time as transmissions of the L1-RP 206A. This scheduling constraint may preserve fairness between C-LBT transmissions (from the L2-RP 206B) and Wi-Fi transmissions (from the AP 208), i.e., instead of a $T_{mcot}$ of 8 ms, L2-RPs may only be allowed a 7 ms $T_{mcot}$. Similarly, although not shown in FIG. 2, the L2-RP 206B may transmit a different reservation signal (e.g., using the reservation signal module 226B), which can be further captured by farther-away RPs (i.e., candidate L3-RPs (not shown)), subsequently allowed to transmit for 6 ms, and so on through the rest of the RPs. If multiple RPs 206 receive the same reservation signal, there may be multiple RPs designated the same "Level" status, e.g., multiple L3-RPs. In some examples, there may only be one L1-RP 206A in the LAA network, but multiple RPs 206 may be allowed in other levels (e.g., L2-L8).

Therefore, the "Level" status of an RP 206 may generally reflect a proximity of the RP 206 to the L1-RP 206A, i.e., the L2-RP 206B is designated an L2-RP 206B because it received (with sufficient SINR) the reservation signal from the L1-RP 206A, while an RP may be designated an L3-RP (not shown) if it receives a different reservation signal (not shown) from the L2-RP 206B, etc. In other words, the "Level" of a particular RP 206 may indicate the number of different RP nodes that are traversed from the L1-RP 206A to the particular RP 206, i.e., L2-RPs 206B receive a reservation signal 220 directly from the L1-RP 206A, while L3-RPs (not shown) receive a reservation signal from an L2-RP 206B that receives the reservation signal 220 directly from the L1-RP 206A, etc.

Although it is unlikely that an LAA network extends such distances, an L8-RP (not shown) may receive a reservation signal from an L7-RP (not shown) and may only have 1 ms transmission available. Therefore, an L8-RP may not transmit a reservation signal. Rather, since it must finish its transmission at the same time as the L1-RP 206a, an L8-RP may directly transmit data during a 1 ms span and stop the "voice spread." For convenience, the "voice spread" may be limited to the desired level, from L1 (Uncoordinated LBT) up to L8. It should also be noted that the "Level" status of a particular RP 206 may change regularly depending on which RP 206 is designated the L1-RP 206A when its backoff counter ($D_r^{LBT}$) reaches zero.

After the transmission period (e.g., transmission of PDSCH resource blocks), all the RPs 206 may continue their LBT process. Specifically, the L1-RP 206A may use a new $D_r^{LBT}$, and the rest of the RPs (e.g., L2-RP 206B) may continue from their previous backoff counters ($D_r^{LBT}$). In the non-coordinated LBT (as described in 3GPP TS 36.213 v13.0.0), each RP 206 chooses its own random value for $D^{LBT}$, and if two or more RPs choose the same value, their transmissions will collide, not allowing other RPs (e.g., L2-RPs 206B) to decode the reservation signal 220 appropriately due to the high interference level. One of the benefits of the C-RAN infrastructure is to provide the network with the capability to synchronize/coordinate several functions in the network. A new mechanism for the computation of backoff counters ($D^{LBT}$) that exploits this coordination will be discussed below. The new mechanism may generate the backoff counters ($D_r^{LBT}$) using a pseudo-random algorithm at the controller 104 that ensures that two different RPs 206 do not have the same value, and the values are distributed to each of the RPs 206, avoiding collisions.

Figure 3:
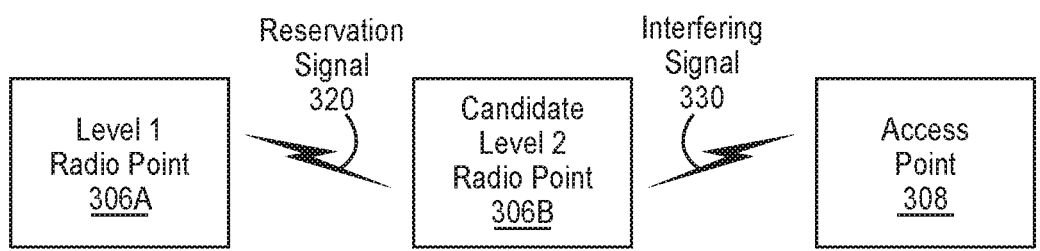
FIG. 3 is a block diagram illustrating another exemplary C-RAN configuration using C-LBT.

FIG. 3 is a block diagram illustrating another exemplary C-RAN configuration using C-LBT. Similar to FIG. 2, FIG. 3 illustrates two RPs 306A-B that may belong to the same C-RAN and use a C-LBT mechanism for LAA. One or more APs 208 may be positioned close enough to interfere with signals received at the L2-RP 206B.

In contrast to FIG. 2, however, the AP 308 in FIG. 3 may be transmitting an interfering signal 330 while the candidate L2-RP 306B receives a reservation signal 320 from the L1-RP 306A. This interference may cause the candidate L2-RP 306B to receive the reservation signal 320 with a reduced SINR, i.e., below the reservation detection threshold ($\Gamma_L$) for the candidate L2-RP 306B. Therefore, the candidate L2-RP 306B is not considered an L2-RP 306B and cannot transmit until its backoff counter ($D_r^{LBT}$) reaches zero or it receives another reservation signal 220 with an SINR that exceeds the reservation detection threshold ($\Gamma_L$) for the candidate L2-RP 306B.

Reservation Signal Structure

Figure 4:
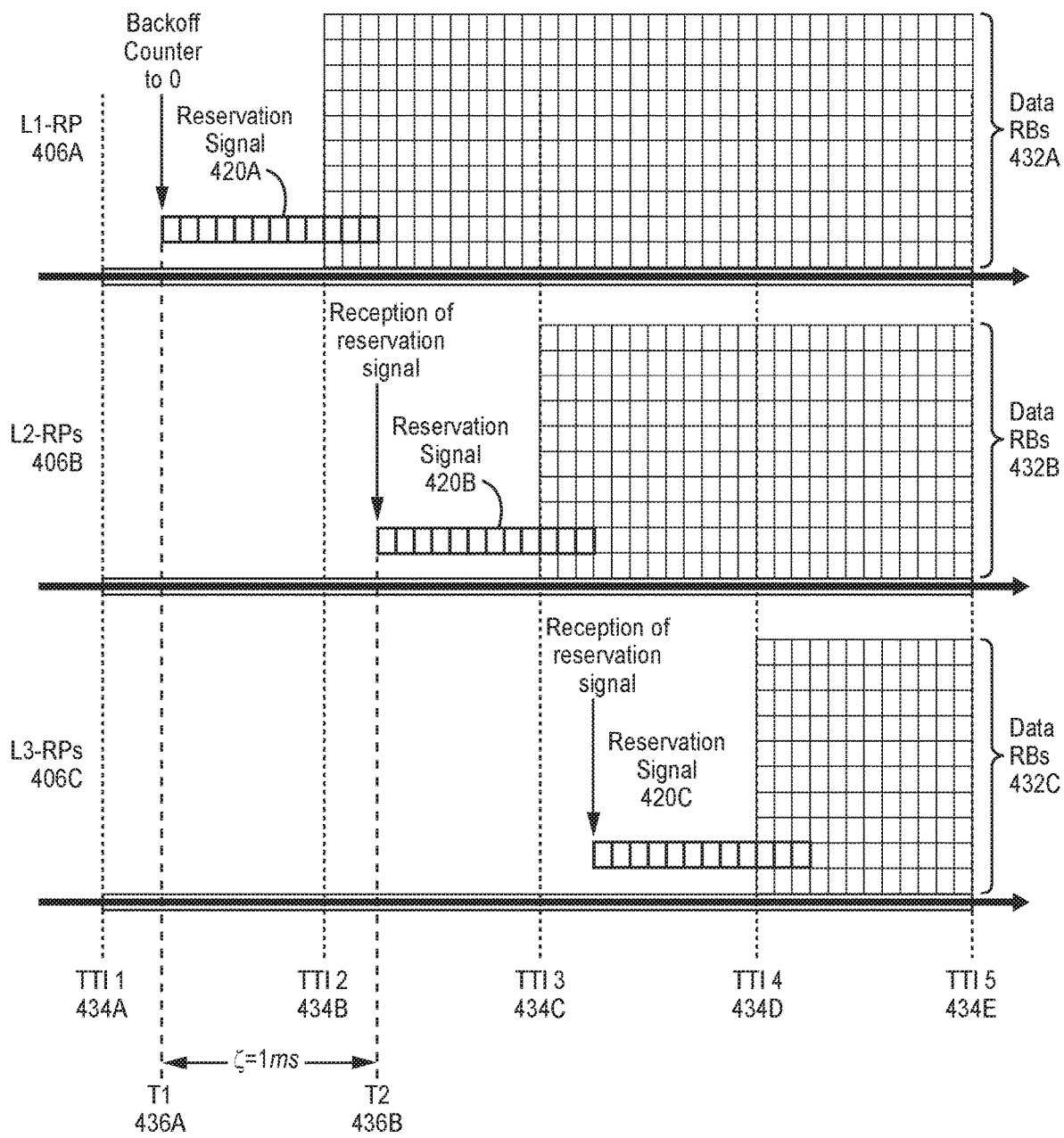
FIG. 4 is a block diagram illustrating exemplary reservation signals sent from radio points (RPs) in a C-RAN using C-LBT.

FIG. 4 is a block diagram illustrating exemplary reservation signals sent from RPs 406A-C in a C-RAN using C-LBT. According to the LTE standard (e.g., as found in 3GPP TS 36.213 v13.0.0), LTE transmissions need to be synchronized to start at the beginning of a subframe (i.e., at the beginning of each TTI 434A-E of 1 ms). In order to achieve this synchronization, when a backoff counter ($D_r^{LBT}$) for a given RP (e.g., L1-RP 406A) reaches zero (beginning at time T1 436A), it may transmit a reservation signal 420A before the start of the PDSCH burst (data resource blocks (RBs) 432A). This period before the data RBs 432A, which can not be used to transmit data to the end users, will be employed to transmit the reservation signal 420A with a custom pattern recognizable by other RPs (e.g., L2-RP 406B).

Each RP level (from L1-RPs 406A to L8-RPs (not shown)) may transmit a different pattern in its respective reservation signals 420. For example, the reservation signal 420B sent by the L2-RP 406B may be different than the reservation signal 420A sent by the L1-RP 406A and the reservation signal 420C sent by the L3-RP 406C. However, the reservation signal 420B sent by the L2-RP 406B may include the same pattern as a reservation signal sent by other L2-RPs (not shown). Furthermore, a pattern in each reservation signal 420 may identify the "Level" of the transmitting RP 406, i.e., a reservation signal 420 sent from the L1-RP 406A may identify the L1-RP 406A as belonging to Level 1 while a reservation signal sent from the L2-RP 406B may identify the L2-RP 406B as belonging to Level 2.

The reservation signal 420 may indicate a transmission duration for the next level, so that transmissions from all different levels end at the same time. For example, the reservation signal 420A sent by the L1-RP 406A may indicate the transmission duration for L2-RP 406B, e.g., the L1-RP 406A and L2-RP 406B may have a $T_{mcot}$ of 8 ms and 7 ms, respectively. The reasoning behind requiring transmissions 432A-C from all levels of RPs 406 to end at the same time is to prevent RPs 406 from cascading and alternating their transmissions, which could potentially create hidden nodes.

In one possible configuration, the reservation signal 420 duration may be uniformly distributed among the RPs 406 between 0 and 1 ms, i.e., different length reservation signals 420 for different RPs 406. However, this random distribution of the reservation signal duration may be undesirable since: (1) a small reservation signal period may prevent other RPs 406 from decoding the pattern and joining the transmission; and (2) a short reservation signal may harm Wi-Fi communications. Therefore, the reservation signal 420 duration should be long enough to allow APs out of the L1-RP 406A energy detection threshold range to finalize their DCF counters and start transmitting, thus preventing potential L2-RPs 406B from joining and interfering with the AP communications.

To avoid the problems associated with small reservation signal 420 duration, each RP 406 may extend the transmission of the reservation signal 420 up to =1 ms to ensure a fair coexistence, i.e., to allow nearby APs to complete their counters and to allow other RPs 406 to appropriately decode the custom pattern in the reservation signal 420. To extend the reservation signal 420 to 1 ms, an appropriate number of resource blocks 432 may be used to recreate the proprietary reservation signal 420 only decodable by other RPs 406, while the rest of resource blocks 432 may be used to transmit downlink data (e.g., PDSCH data) for the end users. In other words, as illustrated in FIG. 4, some of the RBs 432 may be used to transmit a portion of the reservation signal 420 instead of downlink data (e.g., PDSCH data) for the end users.

Estimation of Reservation Detection Threshold (TL)

Figure 5:
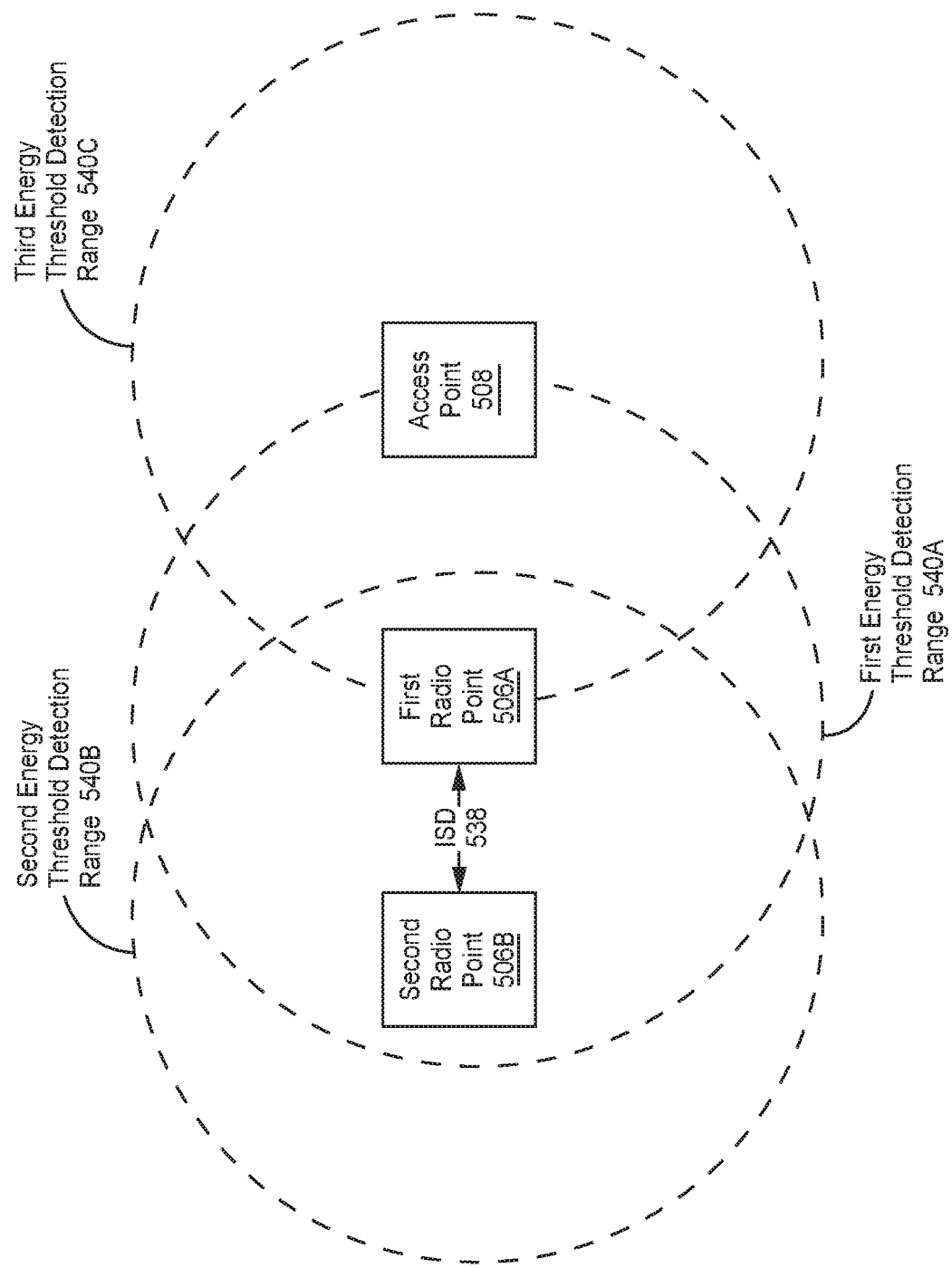
FIG. 5 is a block diagram illustrating exemplary RPs in a C-RAN using C-LBT.

FIG. 5 is a block diagram illustrating exemplary RPs 506A-B in a C-RAN using C-LBT. The C-RAN may include at least a first RP 506A and a second RP 506B. As discussed previously, a Level i ($L_i$)-RP (e.g., the first radio point 506A) may be allowed to transmit only if the reservation signal is received from the upper level with an SINR exceeds a proprietary reservation detection threshold ($\Gamma_L$). For example, the first radio point 506A may only transmit, in response to receiving a reservation signal from the second radio point 506B, if the reservation signal is received with an energy (or SINR) that exceeds the reservation detection threshold ($\Gamma_L$). This threshold ($\Gamma_L$) may be set to ensure the $L_i$-RP (e.g., the first radio point 506A) does not prevents the AP 508 (that would transmit if the first radio point 506A would not join the coordinated LBT) from transmitting. Two options for estimating the reservation detection threshold ($\Gamma_L$) are discussed below.

In a first option, the reservation detection threshold ($\Gamma_L$) may be estimated with minimal (or no) prior information from the network. For example, the reservation detection threshold ($\Gamma_L$) for the first radio point 506A may be estimated by assessing the worst-case scenario, where the interference caused by the AP 508 is minimized while in the first energy threshold detection range (i.e., Fed) 540A and when the Li-RP $r^0$ (e.g., the second radio point 506B) is situated at the minimum Inter Site Distance (ISD) 538 from the first radio point 506A. The first radio point 506A may also be inside the second energy threshold detection range 540B when it is located at the minimum Inter Site Distance (ISD) 538 from the second radio point 506B, as illustrated in FIG. 5. The reservation detection threshold ($\Gamma_L$) of the first radio point 506A for this worst case (e.g., illustrated in FIG. 5) may be:

$$\Gamma_L = 10^{0.3 \cdot \Phi^{-1}(1-q)} \cdot \frac{\Lambda_r G'_{r',r}}{\sigma^2 + \Gamma_{ed}}$$

where $\Lambda_r$ is the transmit power of the second radio point 506B (that may or may not be the same as the transmit power of the first radio point 506A) and $G_{r',r}$ is the channel gain between RP r and a RP at the minimum ISD 538, e.g., the channel chain between the second radio point 506B and the first radio point 506A. This channel gain includes pathloss, antenna gain, shadowing and fading. Assume that fading is averaged out during the reservation signal, and that the shadowing may be modeled as a gaussian random variable centered at zero and with a standard deviation of 3 dB.

Therefore, to achieve a high probability q for the RP $r^0$ (e.g., the second radio point 506B) to not interfere, a reservation detection threshold ($\Gamma_L$) may be determined based on Equation (2):

$$\Gamma_L = \frac{\Lambda_r \max(G_{r',r})}{\sigma^2 + \min(\text{Interference})} = \frac{\Lambda_r G'_{r',r}}{\sigma^2 + \Gamma_{ed}}$$

where $G'_{r',r}$ is the channel gain without including shadowing and where $\Phi^{-1}$ is the inverse cumulative distribution function (CDF) of the normalized Gaussian. As an example, assuming line of sight between the first radio point 506A and the AP 508, q=0.99 using link parameters specified at Table 1 for a $\Gamma_{ed}$=−62 dBm and a min(ISD)=25 m, $\Gamma_L \approx 27$ dB.

TABLE 1

Example Link Estimation Parameters

| Parameter | Value |
|---|---|
| RP Layout | 100 m radius area with minimum ISD of 25 m |
| Users Drop | Uniformly random in a 120 m radius area |
| Bandwidth | BW = 20 MHz |
| Frequency Carrier | $F_c$ = 5 GHz |
| Total RP (AP) TX Power | $\Lambda_L$= 24 dBm; $\Lambda_W$ = 24 dBm |
| Pathloss (PL) | $PL_{LOS}(d)$ = 22 log(d) + 41.97 |
|  | $PL_{NLOS}(d)$ = 36.7 log(d) + 40.87 |
| Probability of LOS | $P_{LOS} = \min\left(\frac{18}{d}, 1\right) \cdot \left(1 - e^{-\frac{d}{36}}\right) + e^{-\frac{d}{36}}$ |
| Shadowing (standard deviation) | LOS:3 dB, NLOS:4 dB |
| Fast Fading | Averaged out through time |
| Thermal Noise | $\sigma^2$ = −104 dB |
| UE Noise Figure | 9 dB |
| $\Gamma_{cs}/\Gamma_{ed}/\Gamma_L$ | −82 dB/−62 dB/according to Eq. (2) |
| λ, μ | 80 arrivals per second, 2.5 sec per session |

This simple method to estimate $\Gamma_L$ is conservative and may only require the minimum ISD as input. However, a more realistic value can be obtained by an adaptive algorithm or a careful network planning and analysis.

For example, in a second option, the reservation detection threshold ($\Gamma_L$) may be estimated using network measurements. For example, the reservation detection threshold ($\Gamma_L$) may be estimated after several rounds of transmissions with the C-LBT feature disabled during which the centralized controller informs each RP 506 about which RP 506 (if any) is performing a transmission. This may allow the different RPs 506 to capture the different SINRs with and without Wi-Fi interference, expecting to get differentiated power levels in both situations and being able to establish their own $\Gamma_L$ to ensure with a high probability that their transmission will occur only when there is no Wi-Fi transmissions present.

Coexistence Properties

The present systems and methods may allow RPs 506 to bypass non-coordinated LBT and transmit simultaneously if they sense a reservation signal from another RP 506. Furthermore, from the AP 508 point of view, the behavior of the RP 506 is unchanged with the C-LBT modifications. Any AP 508 in the energy detection range of an L1-RP will not see their access capability perturbed since the AP may detects an L1-RP transmission and will not transmit simultaneously. In an example where the first radio point 506A becomes the L1-RP in response to its backoff counter ($D_r^{LBT}$) reaching zero during C-LBT, the AP 508 would fall within the first energy threshold detection range 540A and would be unaffected (compared to traditional LBT).

In another example, assume the second radio point 506B becomes the L1-RP in response to its backoff counter ($D_r^{LBT}$) reaching zero during C-LBT. In this example, AP 508 may be outside the second energy detection range of the second radio point 506B. In this case, the AP 508 may decrease its backoff counter, which may be small (e.g., anywhere from 1-50 μs) compared with the =1 ms duration of the reservation signal (from the second radio point 506B), and transmit. Therefore, the SINR of the reservation signal (from the second radio point 506B) will remain below the reservation detection threshold ($\Gamma_L$), thus preventing all the RPs (e.g., the first radio point 506A) in the third energy detection range 540C of this AP 508 from simultaneously transmitting. Therefore, under a full-buffer assumption (i.e., the AP 508 always has a packet to transmit) and by setting $\Gamma_L$ appropriately, the C-LBT mechanism described herein may achieve the same level of coexistence as LBT.

It should be noted that, if full buffer is no longer assumed (i.e., if we do not assume that the AP 508 has always a packet to transmit), C-LBT may not always achieve the same level of coexistence as LBT. For example, at time t an RP r 506 may start its reservation signal transmission. In the period (t,t+1000) μs the AP 508 does not have a packet to transmit and therefore a L2-RP r0 in the detection range of both the AP 508 and RP r 506 starts to transmit at t+1000 μs. If the AP 508 receives a packet to transmit at t+1001 μs, it will not be able to transmit, unlike in the case of LBT.

Figure 6:
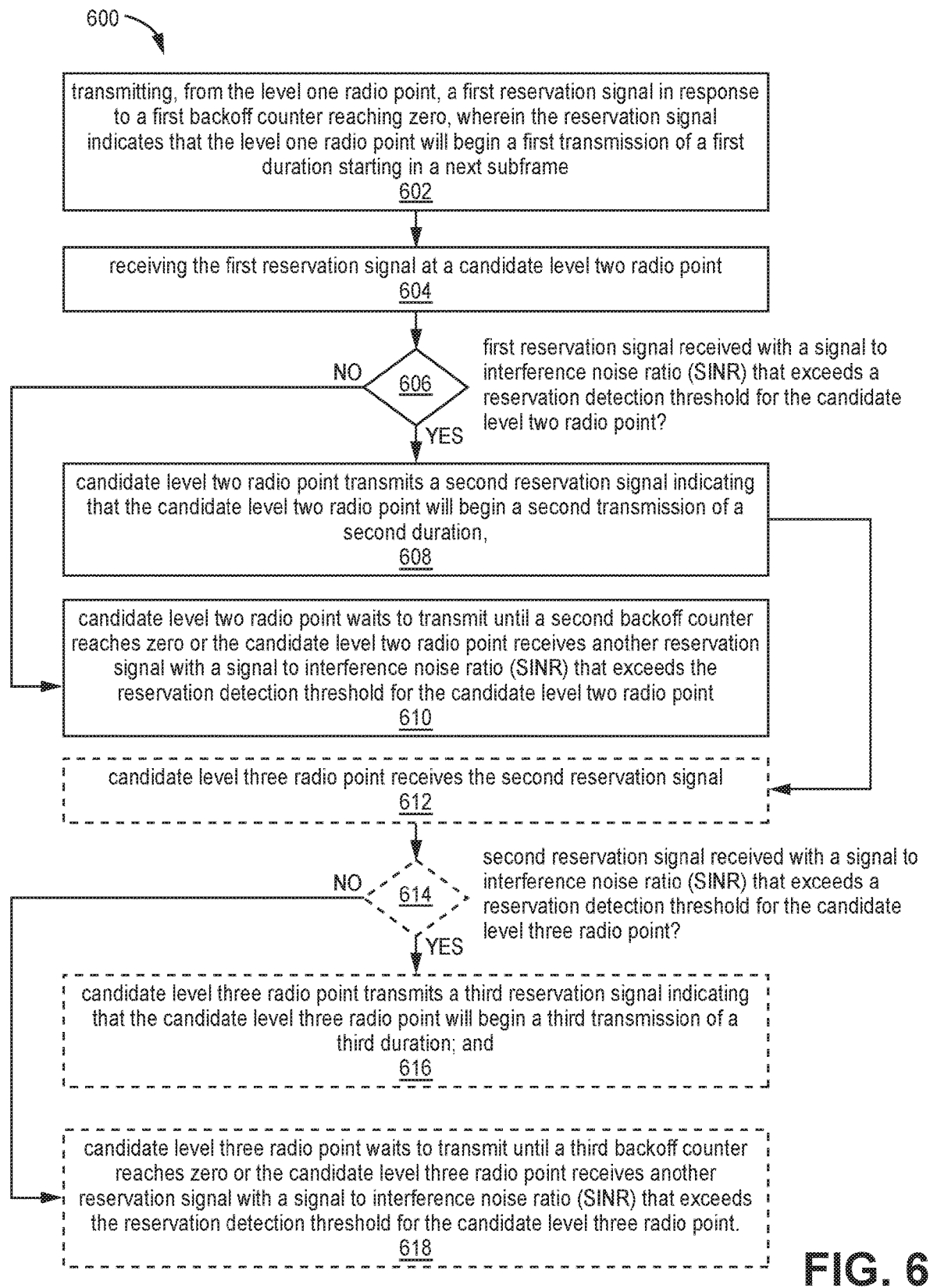
FIG. 6 is a high-level flow chart illustrating one exemplary method for Coordinated Listen Before Talk (C-LBT) in a C-RAN using Licensed-Assisted Access (LAA)

FIG. 6 is a high-level flow chart illustrating one exemplary method for Coordinated Listen Before Talk (C-LBT) in a C-RAN using Licensed-Assisted Access (LAA). The method 600 shown in FIG. 6 is described here as being implemented in the C-RAN (e.g., in FIG. 2), though it is to be understood that other configurations can be implemented in other ways.

The blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner). Also, most standard exception handling is not described for ease of explanation; however, it is to be understood that method 600 can and typically would include such exception handling.

An L1-RP 206A may transmit 602 a first reservation signal 220 in response to a first backoff counter 222A reaching zero. The L1-RP 206A may decrement the first backoff counter 222A once for every idle time slot observed by the L1-RP 206A. A slot may be "idle" if a detected energy level is below an energy detection threshold ($\Gamma_{ed}$) for at least a predetermined period of time in the slot, e.g., at least 4 μs out of the 9 μs in the slot. The reservation signal 220 may indicate that the L1-RP 206A will begin a first transmission (e.g., a burst of PDSCH RBs 432A) of a first duration (e.g., $T_{mcot}$=8 ms) starting in a next subframe.

The pattern in each reservation signal may identify the "Level" of the transmitting RP 406. Therefore, the reservation signal 220 sent from the L1-RP 206A may indicate that the L1-RP 206A belongs to Level 1. This may be done explicitly (e.g., a value included in the reservation signal 220 matching the level of the transmitting RP 206) or implicitly (e.g., the level of the transmitting RP 206 is gleaned from modulation, redundancy, or other transmission parameters of the reservation signal 220).

A candidate L2-RP 206B may receive 604 the first reservation signal 220. In this example, the receiving RP 206B may be referred to as a "candidate" (e.g., "candidate L2-RP") because it has received the reservation signal 220 from the L1-RP 206A with an SINR that does not exceed its predetermined reservation detection threshold ($\Gamma_L$) or the RP (e.g., RP 206B) has not yet evaluated the SINR of the received reservation signal 220 with respect to its reservation detection threshold ($\Gamma_L$). The candidate L2-RP 206B may determine 606 whether the first reservation signal 220 was received with a signal to interference noise ratio (SINR) that exceeds a reservation detection threshold ($\Gamma_L$) for the candidate L2-RP 206B.

When the first reservation signal 200 was received by the candidate L2-RP 206B with a signal to interference noise ratio (SINR) that exceeds the reservation detection threshold ($\Gamma_L$) for the candidate L2-RP 206B, the candidate L2-RP 206B may transmit 608 a second reservation signal (not shown in FIG. 2) indicating that the candidate L2-RP 206B will begin a second transmission (e.g., a burst of PDSCH RBs 432B) of a second duration (e.g., $T_{mcot}$=7 ms). The first transmission (e.g., 432A) and the second transmission (e.g., 432B) may end at the same time due to the different durations ($T_{mcot}$).

The second reservation signal sent from the L2-RP 206B may indicate that the L2-RP 206B belongs to Level 2. The first duration (of the first transmission from the L1-RP 206A) may be longer than the second duration (of the second transmission from the L2-RP 206B).

Alternatively, when the first reservation signal 220 was received by the candidate L2-RP 206B with a signal to interference noise ratio (SINR) that does not exceed the reservation detection threshold ($\Gamma_L$) for the candidate L2-RP 206B, the candidate level two radio point may wait 610 to transmit until a second backoff counter reaches zero. The candidate L2-RP 206B may decrement the second backoff counter once during every idle time slot observed by the candidate L2-RP 206B. Alternatively, the candidate L2-RP 206B may transmit in response to receiving another reservation signal (not shown) with a signal to interference noise ratio (SINR) that exceeds the reservation detection threshold ($\Gamma_L$) for the candidate L2-RP 206B.

Optionally, candidate L3-RP may receive 612 the second reservation signal from the L2-RP 206B. In response to receiving the second reservation signal, the candidate L3-RP may determine 614 whether the second reservation signal was received with a signal to interference noise ratio (SINR) that exceeds a reservation detection threshold ($\Gamma_L$) for the candidate L3-RP.

When the candidate L3-RP received the second reservation signal with a signal to interference noise ratio (SINR) that exceeds the reservation detection threshold ($\Gamma_L$) for the candidate L3-RP, the candidate L3-RP may transmit 616 a third reservation signal indicating that the candidate L3-RP will begin a third transmission (e.g., 432C) of a third duration.

Alternatively, when the candidate L3-RP received the second reservation signal with a signal to interference noise ratio (SINR) that did not exceed the reservation detection threshold ($\Gamma_L$) for the candidate L3-RP, the candidate L3-RP may wait 618 to transmit until a third backoff counter reaches zero or the candidate L3-RP receives another reservation signal with a signal to interference noise ratio (SINR) that exceeds the reservation detection threshold ($\Gamma_L$) for the candidate L3-RP.

The third duration may be shorter than the first duration (of the first transmission from the L1-RP 206A) and the second duration (of the second transmission from the L2-RP 206B). The third transmission may end at a same time as the first transmission and the second transmission.

Performance Evaluation

Assume the performance of the LBT procedure is evaluated with and without coordination using a simulator, e.g., based on 3GPP TS 36.213 v13.0.0 Rel. 13. The simulated scenario may include an Urban Micro scenario where the same number of RPs and APs are randomly dropped in a 100 m radius network area. Given the reduced dimension of the simulated network, to avoid the unsolved problem of hidden nodes, all RPs and APs are within the same energy detection range and therefore C-LBT may be limited only to L2-RPs. Users arrive to any point in the network following a exogenous 2 dimensional Poisson Point Process (PPP) with intensity λ arrivals/sec, and their holding times are exponentially distributed, with a mean rate of μ seconds. Unless otherwise specified the network simulation parameters are specified in Table 1 (above) and based on 3GPP TS 36.213 v13.0.0 Rel. 13. The simulations results are illustrated in FIGS. 7-11.

Total Network Throughput

Figure 7:
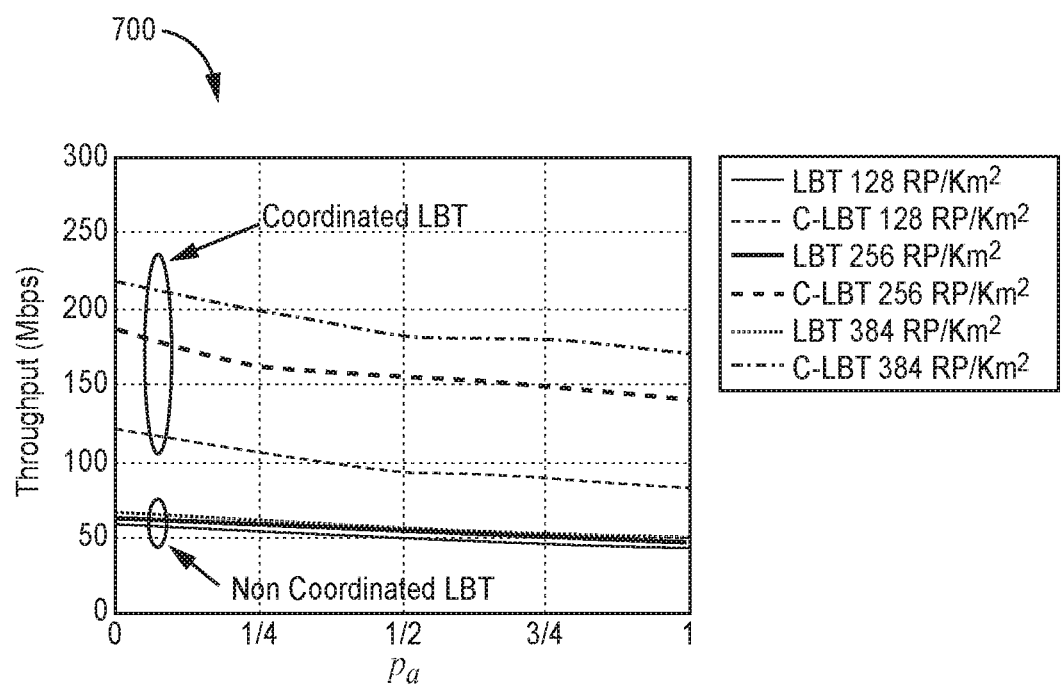
FIG. 7 is an exemplary plot illustrating total network throughput using non-coordinated LBT and C-LBT.

FIG. 7 is an exemplary plot illustrating total network throughput using non-coordinated LBT and C-LBT. Specifically, FIG. 7 shows a box and whisker plot of the total network throughput a 100 m radius network, the same number of RPs and APS and various densities of RP/AP for both coordinated and non-coordinated LBT as well as various Wi-Fi transmission probabilities $p_a$. Unlike in the traditional LBT, in which the time is subdivided among all RPs, C-LBT enables LTE to achieve higher throughput by increasing the density of RPs, as displayed in FIG. 7.

Figure 8:
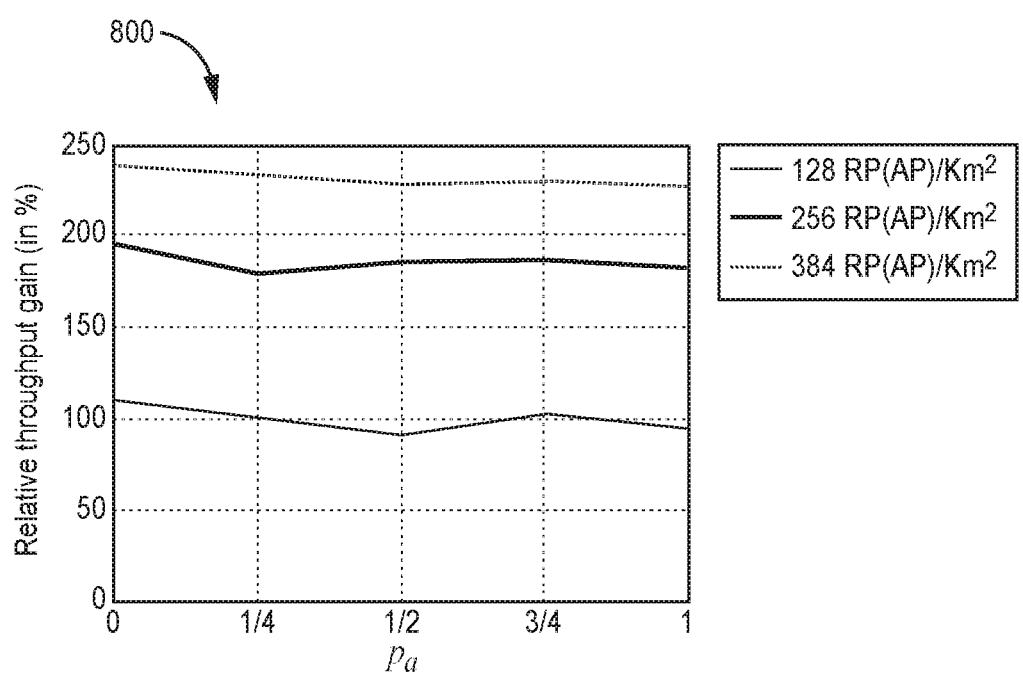
FIG. 8 is an exemplary plot illustrating relative throughput gains associated with non-coordinated LBT and C-LBT.

FIG. 8 is an exemplary plot illustrating relative throughput gains associated with non-coordinated LBT and C-LBT. Specifically, the relative gain may be approximately 100% for the case of 128 RP/Km2 (4 RP in a 100 m network radius area), which is maintained irrespective of the degree of Wi-Fi interference. By duplicating the RP density, the relative gain in network throughput increases to a 180% and reaching a 235% with 12 RPs (or 384 RP/Km2), showing how C-LBT enables densification as a mechanism to enhance the network performance, unlike the standardized (non-coordinated) LBT, which divides the channel access among the different stations, reducing the densification capabilities.

User Throughput and Utility

Figure 9:
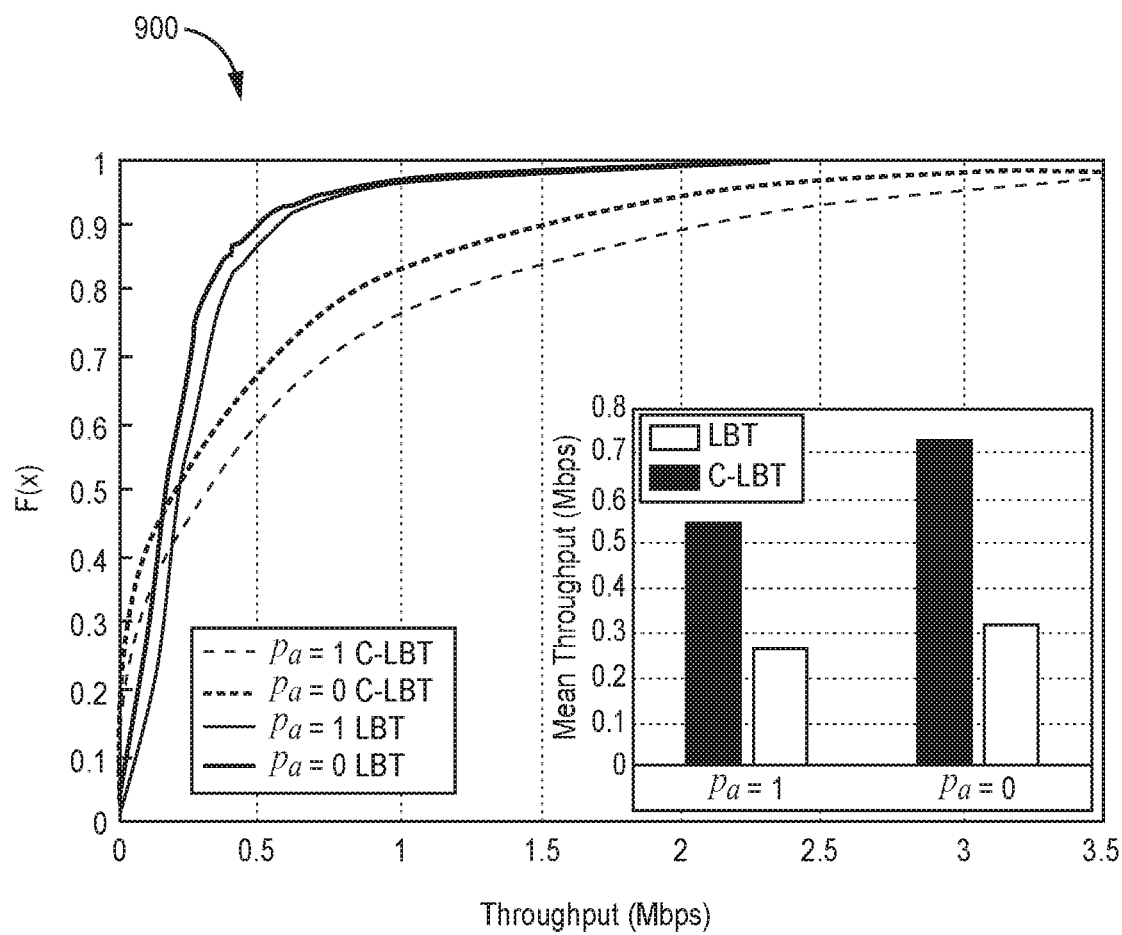
FIG. 9 is an exemplary plot illustrating user network cumulative distribution of throughput for various realizations of non-coordinated LBT and C-LBT.

FIG. 9 is an exemplary plot illustrating user network cumulative distribution of throughput for various realizations of non-coordinated LBT and C-LBT. Specifically, FIG. 9 displays the CDF for the LTE user's throughput for the case of 256 RP/Km2 with and without the presence of Wi-Fi interference, for the case of coordinated and non-coordinated LBT, as well as the mean user throughput in the subplot. The results show that C-LBT improves both the median throughput per user as well as the mean throughput (as displayed in the subfigure). However, the CDF of the C-LBT does not stochastically dominate the LBT, since some users that are located in the edge between cells experience lower SINR because of the interference created by the simultaneous transmissions in the case of C-LBT.

Figure 10:
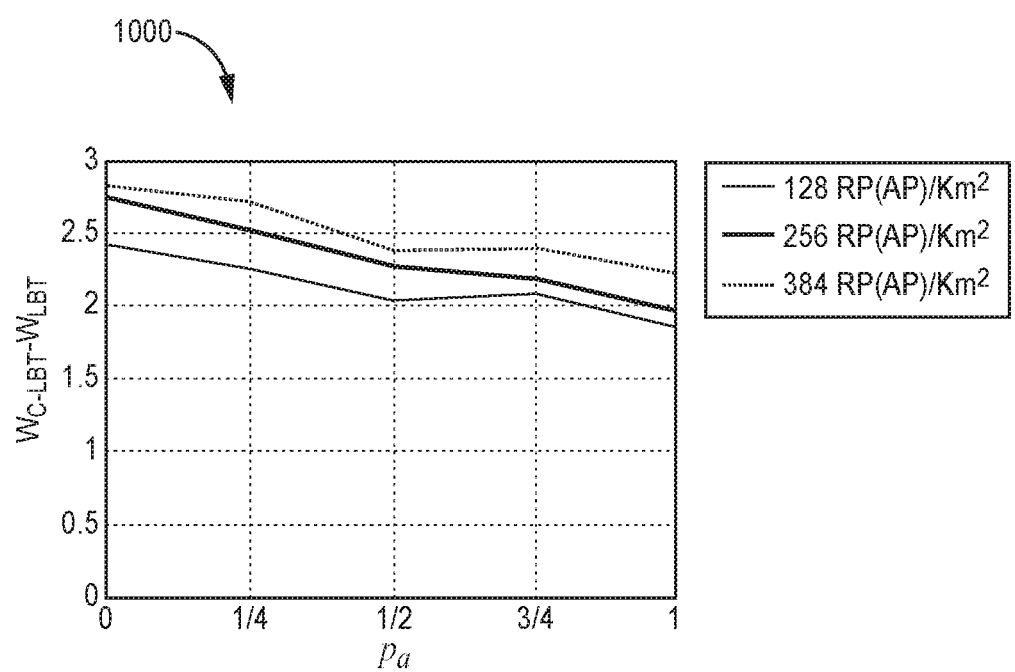
FIG. 10 is an exemplary plot illustrating differences in network utility of C-LBT versus non-coordinated LBT.

FIG. 10 is an exemplary plot illustrating differences in network utility of C-LBT versus non-coordinated LBT. Specifically, FIG. 10 illustrates the mean difference in utility of the users rates with and without LBT coordination, i.e., $E[WC\text{-}LBT(r_u)-WLBT(r_u)]$. The results displayed in FIG. 10 highlight an improvement of utility for different densities which decreases with the degree of Wi-Fi interference and increases with the density of RPs.

Coexistence with Wi-Fi

Figure 11:
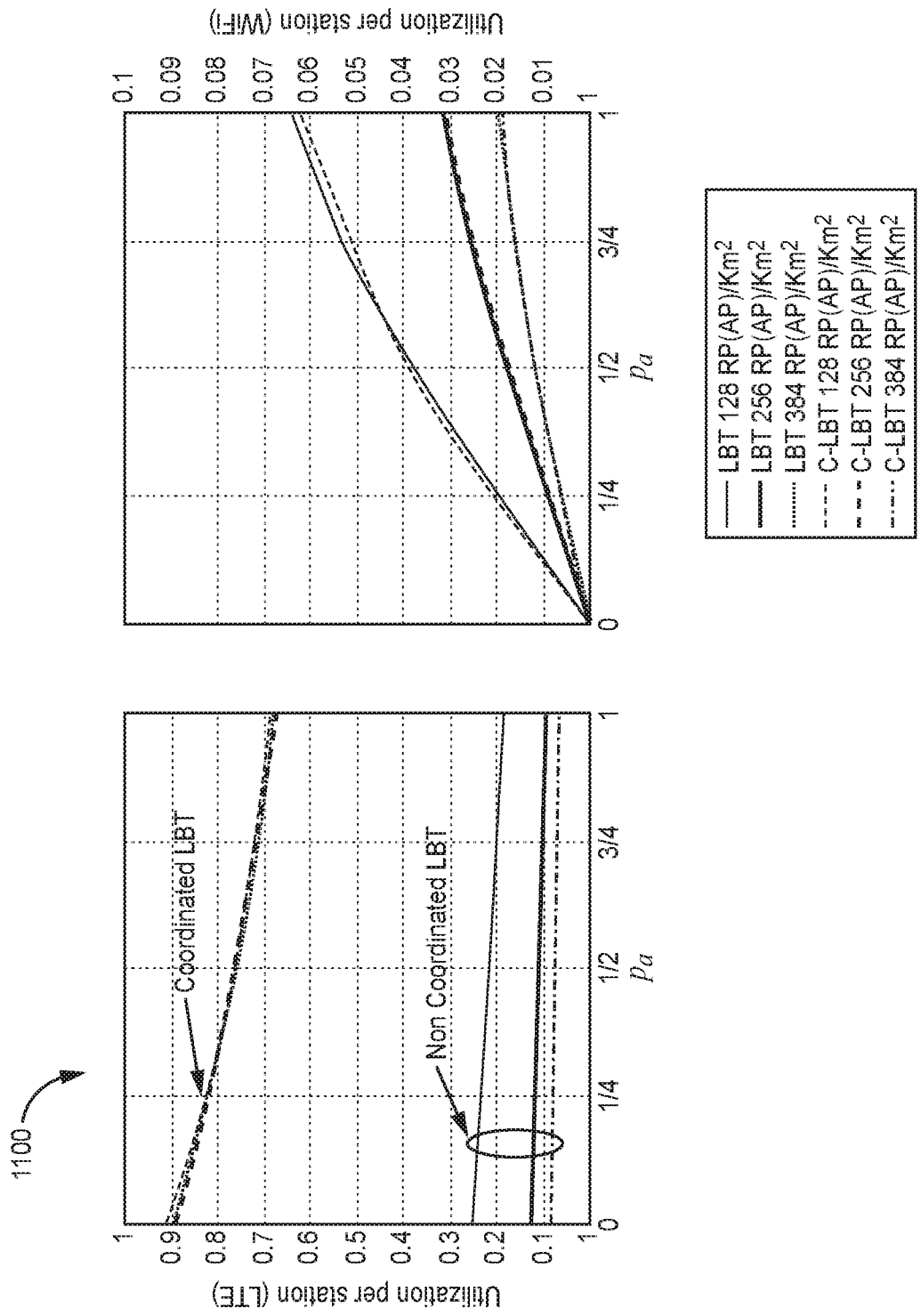
FIG. 11 is an exemplary plot illustrating mean utilization per RP/AP for different densities and Wi-Fi interference probabilities for non-coordinated LBT and C-LBT.

FIG. 11 is an exemplary plot illustrating mean utilization per RP/AP for different densities and Wi-Fi interference probabilities for non-coordinated LBT and C-LBT. As discussed above, C-LBT increases the utilization per RP without impacting the medium access capabilities of the coexistent Wi-Fi network. The Utilization per RP/AP of a RP/AP may be defined as:

$$U_r = \frac{\sum_t 1(P_{r,t})}{T},$$

where $P_{r,t}=1$ if RP/AP r is transmitting at TTI t and T represents the total simulation duration. The results are displayed in FIG. 11, which highlight an increase in utilization for LTE thanks to C-LBT mechanism while maintains the resource utilization of Wi-Fi, confirming that C-LBT does not affect Wi-Fi transmissions.

Computer System Overview

Configurations of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Figure 12:
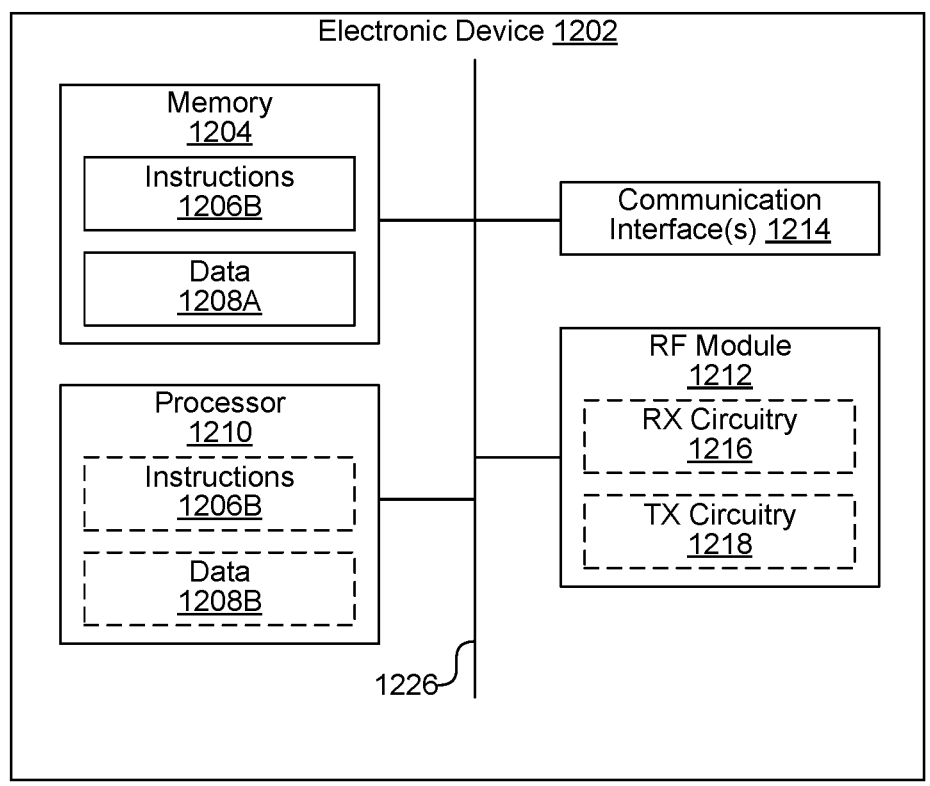
FIG. 12 is a block diagram illustrating an example of an electronic device that may utilize some configurations of the present disclosure.

As such, FIG. 12 is a block diagram illustrating an example of an electronic device that may utilize some configurations of the present disclosure. The illustrated components may be located within the same physical structure or in separate housings or structures. The controllers, radio points, and/or access points described above may be implemented in accordance with one or more of the electronic devices 1202 described in FIG. 12. The electronic device 1202 includes a processor 1210. The processor 1210 may be a general purpose single- or multi-chip microprocessor (e.g., an ARM), a special purpose microprocessor (e.g., a digital signal processor (DSP)), a microcontroller, a programmable gate array, Such hardware or software (or portions thereof) can be implemented in other ways, an application specific integrated circuit (ASIC), etc. The processor 1210 may be referred to as a central processing unit (CPU). Although just a single processor 1210 is shown in the electronic device 1202 of FIG. 12, in an alternative configuration, a combination of processors (e.g., an ARM and DSP) could be used.

The electronic device 1202 also includes memory 1204 in electronic communication with the processor 1210. That is, the processor 1210 can read information from and/or write information to the memory 1204. The memory 1204 may be any electronic component capable of storing electronic information. The memory 1204 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1208*a* and instructions 1206*a* may be stored in the memory 1204. The instructions 1206*a* may include one or more programs, routines, sub-routines, functions, procedures, etc. The instructions 1206*a* may include a single computer-readable statement or many computer-readable statements. The instructions 1206*a* may be executable by the processor 1210 to implement one or more of the methods, functions and procedures described above. Executing the instructions 1206*a* may involve the use of the data 1208*a* that is stored in the memory 1204. FIG. 12 shows some instructions 1206*b* and data 1208*b* being loaded into the processor 1210 (which may come from instructions 1206*a* and data 1208*a*).

The electronic device 1202 may also include one or more communication interfaces 1212 for communicating with other electronic devices. The communication interfaces 1212 may be based on wired communication technology, wireless communication technology, or both. Examples of different types of communication interfaces 1212 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 1202 may also include an RF module 1212 with receive circuitry 1216 and transmit circuitry 1218. The receive circuitry 1216 may include circuitry configured to receive wireless RF signals. The transmit circuitry 1218 may include circuitry configured to transmit wireless RF signals.

The various components of the electronic device 1202 may be coupled together by one or more buses, which may include a power bus, a control signal bus, a status signal bus, a data bus, etc. For simplicity, the various buses are illustrated in FIG. 12 as a bus system 1226. Furthermore, various other architectures and components may be utilized in connection with any electronic device described herein.

Terminology

Brief definitions of terms, abbreviations, and phrases used throughout this application are given below.

The term "determining" may include calculating, computing, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks. The transmission medium used by a network may include coaxial cable, fiber optic cable, twisted pair, digital subscriber line (DSL), or combinations thereof. Wireless networks may also use air as a transmission medium.

Also, for the sake of illustration, various configurations of the present disclosure have herein been described in the context of computer programs, physical components, and logical interactions within modern computer networks. Importantly, while these configurations describe various configurations of the present disclosure in relation to modern computer networks and programs, the method and apparatus described herein are equally applicable to other systems, devices, and networks as one skilled in the art will appreciate. As such, the illustrated applications of the configurations of the present disclosure are not meant to be limiting, but instead are examples. Other systems, devices, and networks to which configurations of the present disclosure are applicable include, for example, other types of communication and computer devices and systems. More specifically, configurations are applicable to communication systems, services, and devices such as cell phone networks and compatible devices. In addition, configurations are applicable to all levels of computing from the personal computer to large network mainframes and servers.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The techniques introduced here may be embodied as special-purpose hardware (such as circuitry), as programmable circuitry appropriately programmed with software and/or firmware, or as a combination of special-purpose and programmable circuitry. Hence, configurations may include a machine-readable medium (also referred to as a computer-readable medium) having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium may be tangible and non-transitory.

In conclusion, the present disclosure provides novel systems, methods, and arrangements of C-LBT for LTE LAA. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a system for channel access in Long Term Evolution (LTE) License-Assisted Access (LAA), the system comprising: a controller; and a plurality of radio points; wherein a level one radio point transmits a first reservation signal in response to a first backoff counter reaching zero, wherein the first reservation signal indicates that the level one radio point will begin a first transmission of a first duration starting in a next subframe; and wherein a candidate level two radio point receives the first reservation signal and determines whether the candidate level two radio point received the first reservation signal with a signal to interference noise ratio (SINR) that exceeds a reservation detection threshold for the candidate level two radio point.

Example 2 includes the system of Example 1, wherein, when the candidate level two radio point received the first reservation signal with an SINR that exceeds the reservation detection threshold for the candidate level two radio point, the candidate level two radio point transmits a second reservation signal indicating that the candidate level two radio point will begin a second transmission of a second duration; and wherein, when the candidate level two radio point received the first reservation signal with an SINR that does not exceed the reservation detection threshold for the candidate level two radio point, the candidate level two radio point waits to transmit until a second backoff counter reaches zero or the candidate level two radio point receives another reservation signal with an SINR that exceeds the reservation detection threshold for the candidate level two radio point.

Example 12 includes the system of Example 2, wherein the level one radio point decrements the first backoff counter once for every idle time slot observed by the level one radio point, wherein the candidate level two radio point decrements the second backoff counter once during every idle time slot observed by the candidate level two radio point.

Example 4 includes the system of Example 12, wherein a time slot is an idle time slot when a receiving radio point detects an energy level below an energy detection threshold for the receiving radio point during a predetermined period of time in the time slot.

Example 5 includes the system of any of Examples 2-4, wherein the first duration is longer than the second duration, wherein the first transmission ends at a same time that the second transmission ends.

Example 6 includes the system of Example 5, wherein the first reservation signal includes a first pattern that identifies the level one radio point as belonging to level one, wherein the second reservation signal includes a second pattern that identifies the candidate level two radio point as belonging to level two.

Example 7 includes the system of any of Examples 2-6, wherein, in response to receiving the second reservation signal, a candidate level three radio point determines whether the second reservation signal was received with an SINR that exceeds a reservation detection threshold for the candidate level three radio point; wherein, when the candidate level three radio point received the second reservation signal with a signal to interference noise ratio (SINR) that exceeds the reservation detection threshold for the candidate level three radio point, the candidate level three radio point transmits a third reservation signal indicating that the candidate level three radio point will begin a third transmission of a third duration; and when the candidate level three radio point received the second reservation signal with an SINR that did not exceed the reservation detection threshold for the candidate level three radio point, the candidate level three radio point waits to transmit until a third backoff counter reaches zero or the candidate level three radio point receives another reservation signal with a signal to interference noise ratio (SINR) that exceeds the reservation detection threshold for the candidate level three radio point.

Example 8 includes the system of Example 7, wherein the third duration is shorter than the first duration and the second duration, wherein the third transmission ends at a same time as the first transmission and the second transmission.

Example 9 includes the system of any of Examples 1-8, wherein the reservation detection threshold for the candidate level two radio point is determined based on an inter site distance between the level one radio point and the candidate level two radio point.

Example 10 includes the system of any of Examples 2-9, wherein the reservation detection threshold for the candidate level two radio point is determined based on SINRs captured during multiple prior rounds of transmissions among the radio points, wherein a centralized controller informs each radio point about which radio point is transmitting during the prior rounds of transmissions.

Example 11 includes the system of any of Examples 2-10, wherein the controller uses a pseudo-random algorithm to determine the first and second backoff counters to ensure that first backoff counter is not the same as the second backoff counter, wherein the controller distributes the first backoff counter to the level one radio point and the second backoff counter to the candidate level two radio point.

Example 12 includes a method for channel access in Long Term Evolution (LTE) License-Assisted Access (LAA), the method comprising: transmitting, from a level one radio point, a first reservation signal in response to a first backoff counter reaching zero, wherein the first reservation signal indicates that the level one radio point will begin a first transmission of a first duration starting in a next subframe; receiving the first reservation signal at a candidate level two radio point; and determining whether the candidate level two radio point received the first reservation signal with a signal to interference noise ratio (SINR) that exceeds a reservation detection threshold for the candidate level two radio point.

Example 13 includes the method of Example 12, when the candidate level two radio point received the first reservation signal with an SINR that exceeds the reservation detection threshold for the candidate level two radio point, the candidate level two radio point transmits a second reservation signal indicating that the candidate level two radio point will begin a second transmission of a second duration; and when the candidate level two radio point received the first reservation signal with an SINR that does not exceed the reservation detection threshold for the candidate level two radio point, the candidate level two radio point waits to transmit until a second backoff counter reaches zero or the candidate level two radio point receives another reservation signal with an SINR that exceeds the reservation detection threshold for the candidate level two radio point.

Example 14 includes the method of Example 13, wherein the level one radio point decrements the first backoff counter once for every idle time slot observed by the level one radio point, wherein the candidate level two radio point decrements the second backoff counter once during every idle time slot observed by the candidate level two radio point.

Example 15 includes the method of Example 14, wherein a time slot is an idle time slot when a receiving radio point detects an energy level below an energy detection threshold for the receiving radio point during a predetermined period of time in the time slot.

Example 16 includes the method of any of Examples 13-15, wherein the first duration is longer than the second duration, wherein the first transmission ends at a same time that the second transmission ends.

Example 17 includes the method of Example 16, wherein the first reservation signal includes a first pattern that identifies the level one radio point as belonging to level one, wherein the second reservation signal includes a second pattern that identifies the candidate level two radio point as belonging to level two.

Example 18 includes the method of any of Examples 13-17, wherein, in response to receiving the second reservation signal, a candidate level three radio point determines whether the second reservation signal was received with an SINR that exceeds a reservation detection threshold for the candidate level three radio point; wherein, when the candidate level three radio point received the second reservation signal with an SINR that exceeds the reservation detection threshold for the candidate level three radio point, the candidate level three radio point transmits a third reservation signal indicating that the candidate level three radio point will begin a third transmission of a third duration; and when the candidate level three radio point received the second reservation signal with an SINR that did not exceed the reservation detection threshold for the candidate level three radio point, the candidate level three radio point waits to transmit until a third backoff counter reaches zero or the candidate level three radio point receives another reservation signal with a signal to interference noise ratio (SINR) that exceeds the reservation detection threshold for the candidate level three radio point.

Example 19 includes the method of Example 18, wherein the third duration is shorter than the first duration and the second duration, wherein the third transmission ends at a same time as the first transmission and the second transmission.

Example 20 includes the method of any of Examples 12-19, wherein the reservation detection threshold for the candidate level two radio point is determined based on an inter site distance between the level one radio point and the candidate level two radio point.

Example 21 includes the method of any of Examples 13-20, wherein the reservation detection threshold for the candidate level two radio point is determined based on SINRs captured during multiple prior rounds of transmissions among the radio points, wherein a centralized controller informs each radio point about which radio point is transmitting during the prior rounds of transmissions.

Example 22 includes the method of any of Examples 13-21, further comprising using a pseudo-random algorithm, at a controller, to determine the first and second backoff counters to ensure that first backoff counter is not the same as the second backoff counter, wherein the controller distributes the first backoff counter to the level one radio point and the second backoff counter to the candidate level two radio point.

The invention claimed is:

1. A system for channel access License-Assisted Access (LAA), the system comprising:
    a controller; and a plurality of radio points communicatively coupled to the controller via a wired network;
        wherein a level one radio point transmits a first reservation signal in response to a first backoff counter reaching zero, wherein the first reservation signal indicates that the level one radio point will begin a first transmission of a first duration starting in a next subframe; and
    wherein a candidate level two radio point receives the first reservation signal and determines whether the candidate level two radio point received the first reservation signal with a signal to interference noise ratio (SINR) that exceeds a reservation detection threshold for the candidate level two radio point,
    wherein, when the candidate level two radio point received the first reservation signal with an SINR that exceeds the reservation detection threshold for the candidate level two radio point, the candidate level two radio point transmits a second reservation signal indicating that the candidate level two radio point will begin a second transmission of a second duration shorter than the first duration;

wherein the first transmission ends at a same time that the second transmission ends.

2. The system of claim 1, wherein, when the candidate level two radio point received the first reservation signal with an SINR that does not exceed the reservation detection threshold for the candidate level two radio point, the candidate level two radio point waits to transmit until a second backoff counter reaches zero or the candidate level two radio point receives another reservation signal with an SINR that exceeds the reservation detection threshold for the candidate level two radio point.

3. The system of claim 2, wherein the level one radio point decrements the first backoff counter once for every idle time slot observed by the level one radio point, wherein the candidate level two radio point decrements the second backoff counter once during every idle time slot observed by the candidate level two radio point.

4. The system of claim 3, wherein a time slot is an idle time slot when a receiving radio point detects an energy level below an energy detection threshold for the receiving radio point during a predetermined period of time in the time slot.

5. The system of claim 2, wherein the first reservation signal includes a first pattern that identifies the level one radio point as belonging to level one, wherein the second reservation signal includes a second pattern that identifies the candidate level two radio point as belonging to level two.

6. The system of claim 2, wherein, in response to receiving the second reservation signal, a candidate level three radio point determines whether the second reservation signal was received with an SINR that exceeds a reservation detection threshold for the candidate level three radio point;

wherein, when the candidate level three radio point received the second reservation signal with a signal to interference noise ratio (SINR) that exceeds the reservation detection threshold for the candidate level three radio point, the candidate level three radio point transmits a third reservation signal indicating that the candidate level three radio point will begin a third transmission of a third duration; and when the candidate level three radio point received the second reservation signal with an SINk that did not exceed the reservation detection threshold for the candidate level three radio point, the candidate level three radio point waits to transmit until a third backoff counter reaches zero or the candidate level three radio point receives another reservation signal with a signal to interference noise ratio (SINR) that exceeds the reservation detection threshold for the candidate level three radio point.

7. The system of claim 6, wherein the third duration is shorter than the first duration and the second duration, wherein the third transmission ends at a same time as the first transmission and the second transmission.

8. The system of claim 1, wherein the reservation detection threshold for the candidate level two radio point is determined based on an inter site distance between the level one radio point and the candidate level two radio point.

9. The system of claim 2, wherein the reservation detection threshold for the candidate level two radio point is determined based on SINRs captured during multiple prior rounds of transmissions among the radio points, wherein a centralized controller informs each radio point about which radio point is transmitting during the prior rounds of transmissions.

10. The system of claim 2, wherein the controller uses a pseudo-random algorithm to determine the first and second backoff counters to ensure that first backoff counter is not the same as the second backoff counter, wherein the controller distributes the first backoff counter to the level one radio point and the second backoff counter to the candidate level two radio point.

11. A method for channel access in License-Assisted Access (LAA), the method comprising:

transmitting, from a level one radio point communicatively coupled to a controller via a wired network, a first reservation signal in response to a first backoff counter reaching zero, wherein the first reservation signal indicates that the level one radio point will begin a first transmission of a first duration starting in a next subframe;

receiving the first reservation signal at a candidate level two radio point; and determining whether the candidate level two radio point received the first reservation signal with a signal to interference noise ratio (SINR) that exceeds a reservation detection threshold for the candidate level two radio point, wherein, when the candidate level two radio point received the first reservation signal with an SINR that exceeds the reservation detection threshold for the candidate level two radio point, the candidate level two radio point transmits a second reservation signal indicating that the candidate level two radio point will begin a second transmission of a second duration shorter than the first duration;

wherein the first transmission ends at a same time that the second transmission ends.

12. The method of claim 11, when the candidate level two radio point received the first reservation signal with an SINR that does not exceed the reservation detection threshold for the candidate level two radio point, the candidate level two radio point waits to transmit until a second backoff counter reaches zero or the candidate level two radio point receives another reservation signal with an SINR that exceeds the reservation detection threshold for the candidate level two radio point.

13. The method of claim 12, wherein the level one radio point decrements the first backoff counter once for every idle time slot observed by the level one radio point, wherein the candidate level two radio point decrements the second backoff counter once during every idle time slot observed by the candidate level two radio point.

14. The method of claim 13, wherein a time slot is an idle time slot when a receiving radio point detects an energy level below an energy detection threshold for the receiving radio point during a predetermined period of time in the time slot.

15. The method of claim 12, wherein the first reservation signal includes a first pattern that identifies the level one radio point as belonging to level one, wherein the second reservation signal includes a second pattern that identifies the candidate level two radio point as belonging to level two.

16. The method of claim 12, wherein, in response to receiving the second reservation signal, a candidate level three radio point determines whether the second reservation signal was received with an SINR that exceeds a reservation detection threshold for the candidate level three radio point;

wherein, when the candidate level three radio point received the second reservation signal with an SINR that exceeds the reservation detection threshold for the candidate level three radio point, the candidate level three radio point transmits a third reservation signal indicating that the candidate level three radio point will begin a third transmission of a third duration; and when the candidate level three radio point received the second reservation signal with an SINR that did not exceed the reservation detection threshold for the candidate level three radio point, the candidate level three radio point waits to transmit until a third backoff counter reaches zero or the candidate level three radio point receives another reservation signal with a signal to interference noise ratio (SINR) that exceeds the reservation detection threshold for the candidate level three radio point.

17. The method of claim 16, wherein the third duration is shorter than the first duration and the second duration, wherein the third transmission ends at a same time as the first transmission and the second transmission.

18. The method of claim 11, wherein the reservation detection threshold for the candidate level two radio point is determined based on an inter site distance between the level one radio point and the candidate level two radio point.

19. The method of claim 12, wherein the reservation detection threshold for the candidate level two radio point is determined based on SINRs captured during multiple prior rounds of transmissions among the radio points, wherein a centralized controller informs each radio point about which radio point is transmitting during the prior rounds of transmissions.

20. The method of claim 12, further comprising using a pseudo-random algorithm, at a controller, to determine the first and second backoff counters to ensure that first backoff counter is not the same as the second backoff counter, wherein the controller distributes the first backoff counter to the level one radio point and the second backoff counter to the candidate level two radio point.

* * * * *